(12) United States Patent
Kotra et al.

(10) Patent No.: US 12,301,800 B2
(45) Date of Patent: May 13, 2025

(54) ENCODER, A DECODER AND CORRESPONDING METHODS USING AN ADAPTIVE LOOP FILTER

(71) Applicant: HUAWEI TECHNOLOGIES CO., LTD., Guangdong (CN)

(72) Inventors: Anand Meher Kotra, Munich (DE); Semih Esenlik, Munich (DE); Jianle Chen, San Diego, CA (US); Han Gao, Shenzhen (CN); Biao Wang, Shenzhen (CN); Zhijie Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/406,193

(22) Filed: Jan. 7, 2024

(65) Prior Publication Data
US 2024/0357094 A1 Oct. 24, 2024

Related U.S. Application Data

(63) Continuation of application No. 18/071,578, filed on Nov. 29, 2022, now Pat. No. 11,870,986, which is a continuation of application No. 17/356,047, filed on Jun. 23, 2021, now Pat. No. 11,523,111, which is a continuation of application No. PCT/CN2019/127535, filed on Dec. 23, 2019.

(60) Provisional application No. 62/822,979, filed on Mar. 24, 2019, provisional application No. 62/787,735, filed on Jan. 2, 2019, provisional application No. 62/784,535, filed on Dec. 23, 2018.

(51) Int. Cl.
| | |
|---|---|
| *H04N 19/117* | (2014.01) |
| *H04N 19/176* | (2014.01) |
| *H04N 19/186* | (2014.01) |
| *H04N 19/82* | (2014.01) |
| *H04N 19/96* | (2014.01) |

(52) U.S. Cl.
CPC ........ *H04N 19/117* (2014.11); *H04N 19/176* (2014.11); *H04N 19/186* (2014.11); *H04N 19/82* (2014.11); *H04N 19/96* (2014.11)

(58) Field of Classification Search
CPC ........... C08L 77/00; C08L 77/02; C08L 77/06
See application file for complete search history.

(56) References Cited

U.S. PATENT DOCUMENTS

2013/0272624 A1* 10/2013 Budagavi ............. H04N 19/172
382/239
2016/0241881 A1* 8/2016 Chao .................... H04N 19/176

* cited by examiner

*Primary Examiner* — Md N Haque

(57) ABSTRACT

A method of filtering a sample value of a picture includes, when an integer t is less than k and an integer j is in the range of 1 to m, generating, with an integer i in the range of 1 to k-t-1, a first filtered sample value by applying a first filter to the value of the sample p(i,j), where the first filter is supported by a first set of filter support samples, which does not comprise any samples p(i',j') with row index i' greater than k-t-1, and generating, with i in the range of k-t to k, a second filtered sample value by applying a second filter to the value of the sample p(i,j), the second filter is supported by a second set of filter support samples, which does not comprise any samples p(i',j') with row index i' less than k-t.

19 Claims, 29 Drawing Sheets

Solution 1:
For block classification of 4x4 block immediate above VB:
• Only use samples above VB in classification (samples in lines E till I)
For block classification of 4x4 block immediate below VB:
• Only use samples below VB in classification (samples in lines P till L)

• We need modified ALF block classification for 4x4 blocks at virtual boundary

Solution 2:
For block classification of 4x4 block immediate above VB:
• Pad line J to line K,L,M
For block classification of 4x4 block immediate below VB:
• Pad line K to line J,I,H

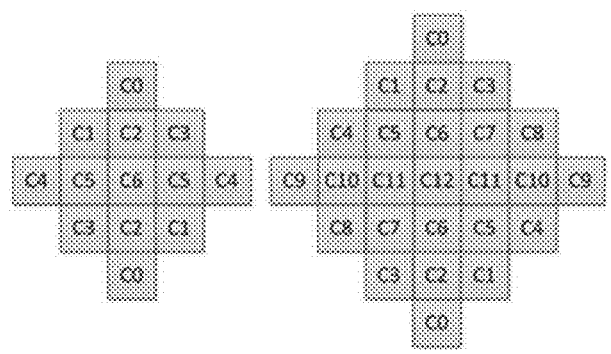
FIG.6 ALF filter shapes (chroma 5 x 5 diamond, Luma 7 x 7 diamond)

(a) Subsampled positions for vertical gradient
(b) Subsampled positions for horizontal gradient
(c) Subsampled positions for diagonal gradient
(d) Subsampled positions for diagonal gradient FIG. 7 Subsampled ALF block classification

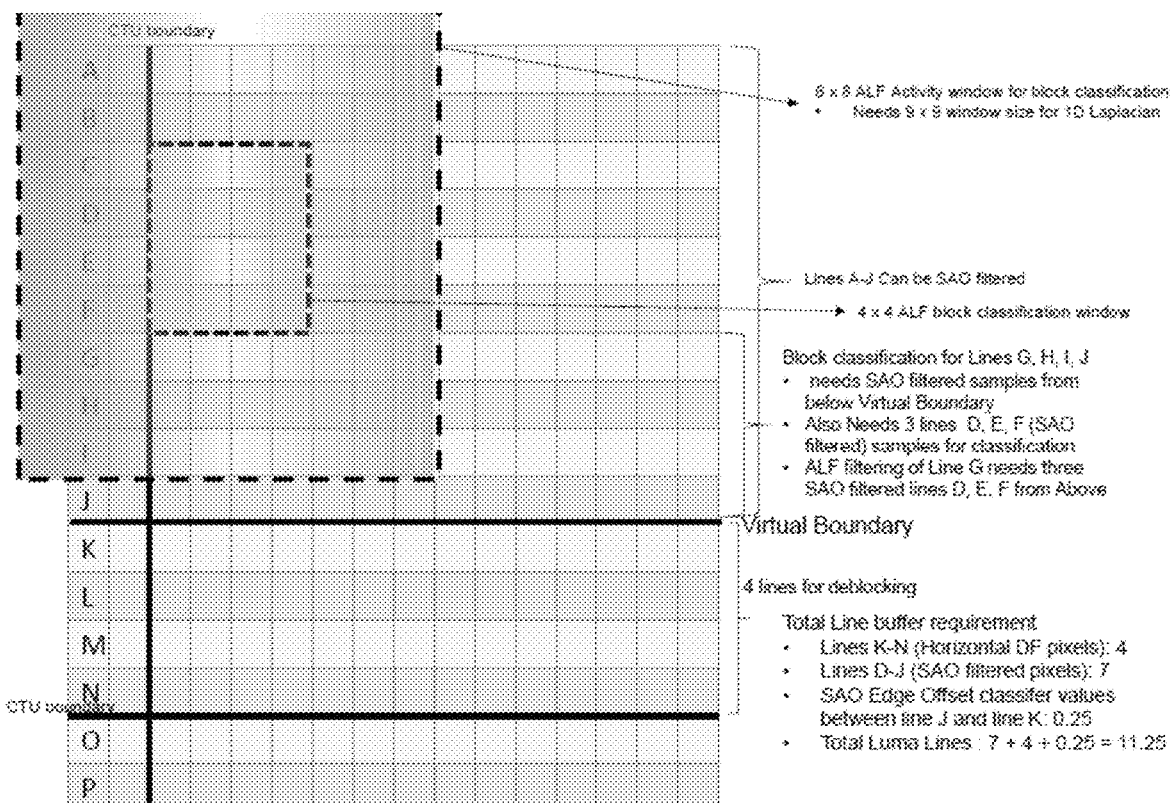
FIG. 8 VTM-3.0 loop filter Luma line buffer requirements

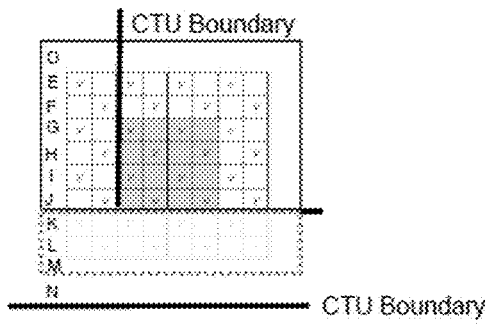

FIG. 9A

Solution 1:
For block classification of 4x4 block immediate above VB:
- Only use samples above VB in classification (samples in lines E till I)

For block classification of 4x4 block immediate below VB:
- Only use samples below VB in classification (samples in lines P till L)

- We need modified ALF block classification for 4x4 blocks at virtual boundary

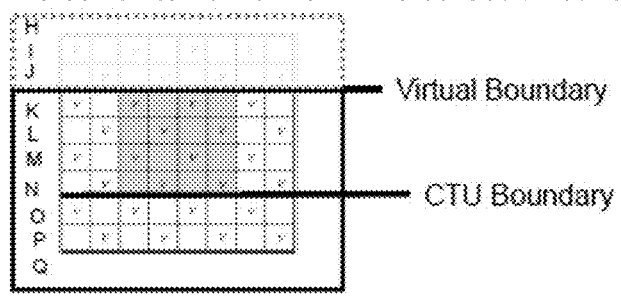

FIG. 9B

Solution 2:
For block classification of 4x4 block immediate above VB:
- Pad line J to line K,L,M For block classification of 4x4 block immediate below VB:
- Pad line K to line J,I,H FIG. 10 Modified ALF classification to avoid ALF Luma Line Buffers (Symmetric variant)
- We need modified ALF block classification for 4x4 blocks at virtual boundary

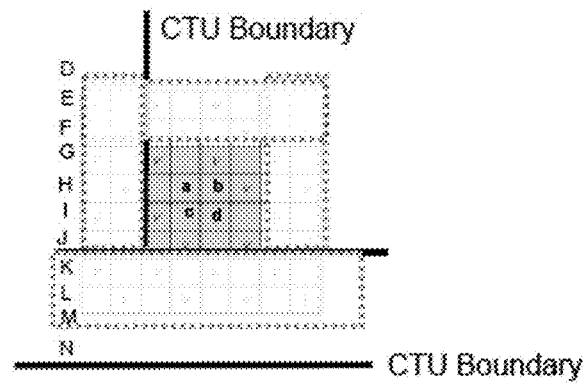

FIG. 10A

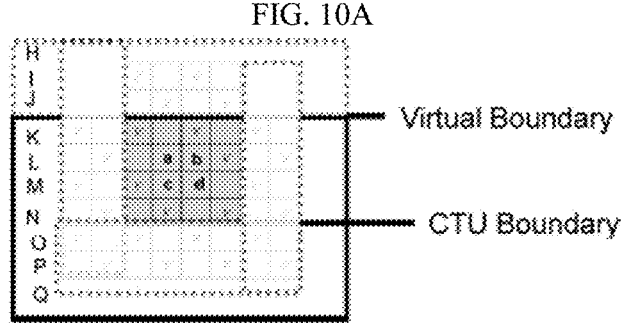

FIG. 10B

Solution 1:
For block classification of 4x4 block immediate above VB (left figure):
- Only use samples above VB in classification. Mainly Samples a, b, c, d are used For block classification of 4x4 block immediate below VB (right figure):
- Only use samples below VB in classification. Mainly Samples a, b, c, d are used

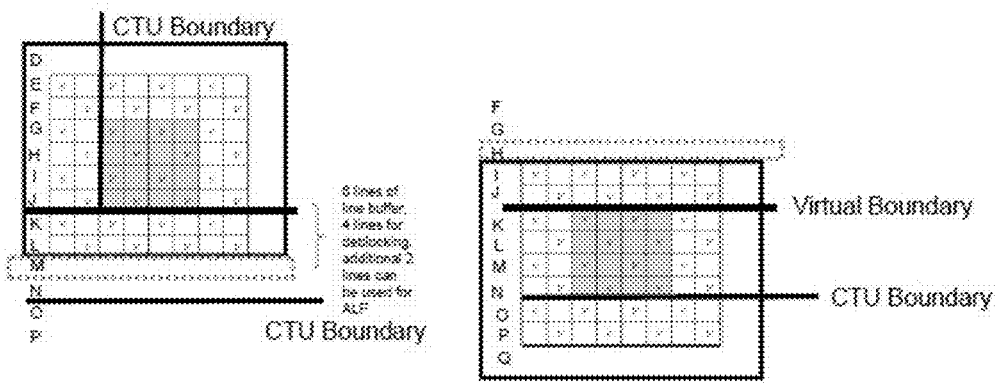
FIG.11 Modified ALF classification to avoid ALF Luma Line Buffers with 6 lines (2 additional lines can be used for ALF block classification)

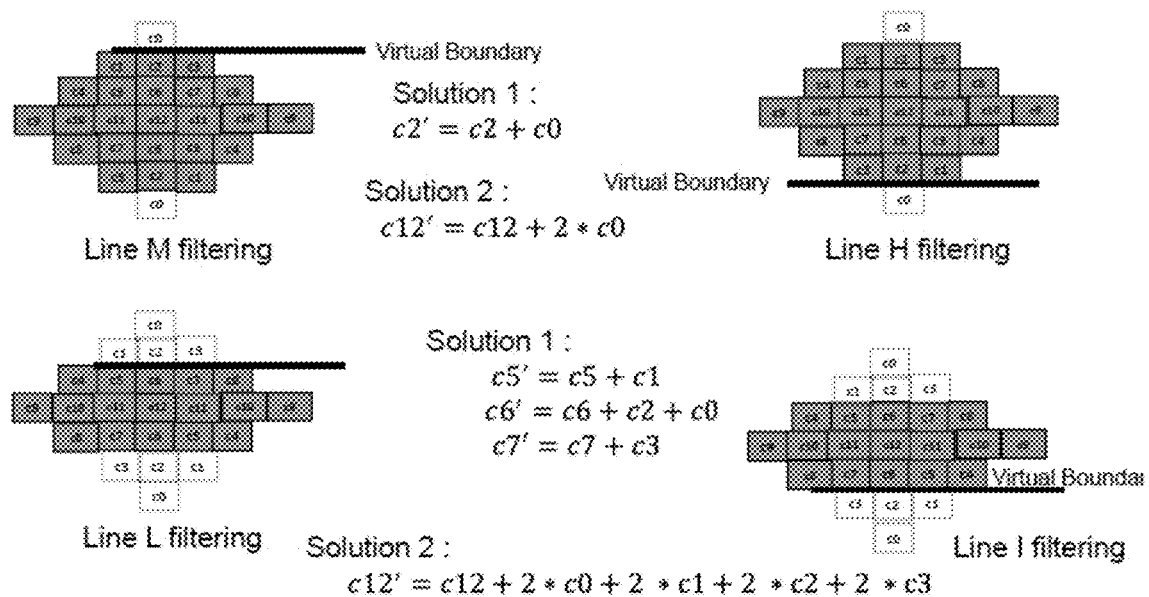
FIG. 12A Modified ALF filter to avoid ALF Luma Line Buffers
- For ALF filtering of lines H, I, J (above virtual boundary) and lines K, L, M (below virtual boundary) the following distorted versions of the filter are used:

FIG. 12B Modified ALF filter to avoid ALF Luma Line Buffers
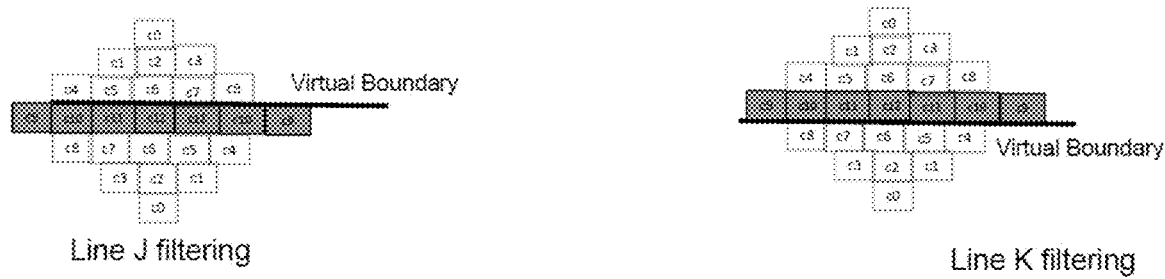
Line J filtering
Line K filtering
Solution 1 :
$$c10' = c10 + c4 + c8$$
$$c11' = c11 + c5 + c7 + c1 + c3$$
$$c12' = c12 + 2 * c6 + 2 * c2 + 2 * c0$$
Solution 2 :
$$c12' = c12 + 2*c0 + 2*c1 + 2*c2 + 2*c3 + 2*c4 + 2*c5 + 2*c6 + 2*c7 + 2*c8$$

FIG. 12C Modified ALF filter to avoid ALF Luma Line Buffers (gradient based filter modification)

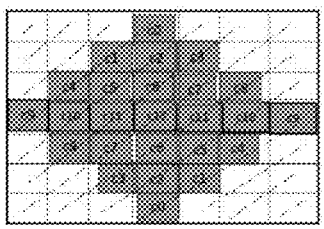
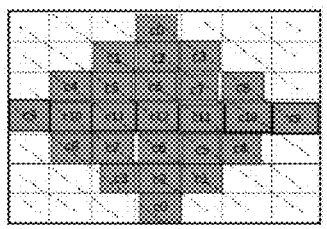
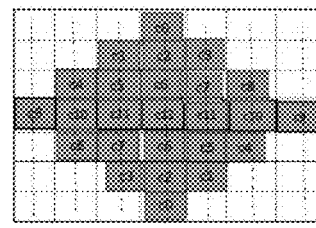

a) 45 Degree Gradient:
One line (Line M and H):
$$c1' = c1 + c0$$
Two lines (Line L and I):
$$c4' = c1 + c4 + c0$$
$$c5' = c5 + c2$$
$$c6' = c6 + c3$$
Three lines (Line J and K):
$$c9' = c9 + c4 + c1 + c0$$
$$c10' = c10 + c5 + c2$$
$$c11' = c8 + c7 + c6 + c3 + c11$$
$$c12' = c12 + 2 * c7$$

b) 135 Degree Gradient:
One line (Line M and H):
$$c3' = c3 + c0$$
Two lines (Line L and I):
$$c6' = c6 + c1$$
$$c7' = c7 + c2$$
$$c8' = c3 + c8 + c0$$
Three lines (Line J and K):
$$c9' = c9 + c8 + c3 + c0$$
$$c10' = c10 + c7 + c2$$
$$c11' = c1 + c6 + c11 + c4$$
$$c12' = c12 + 2 * c5$$

c) Vertical Gradient
For vertical and horizontal gradient, solution 1 from Fig. 12 is used

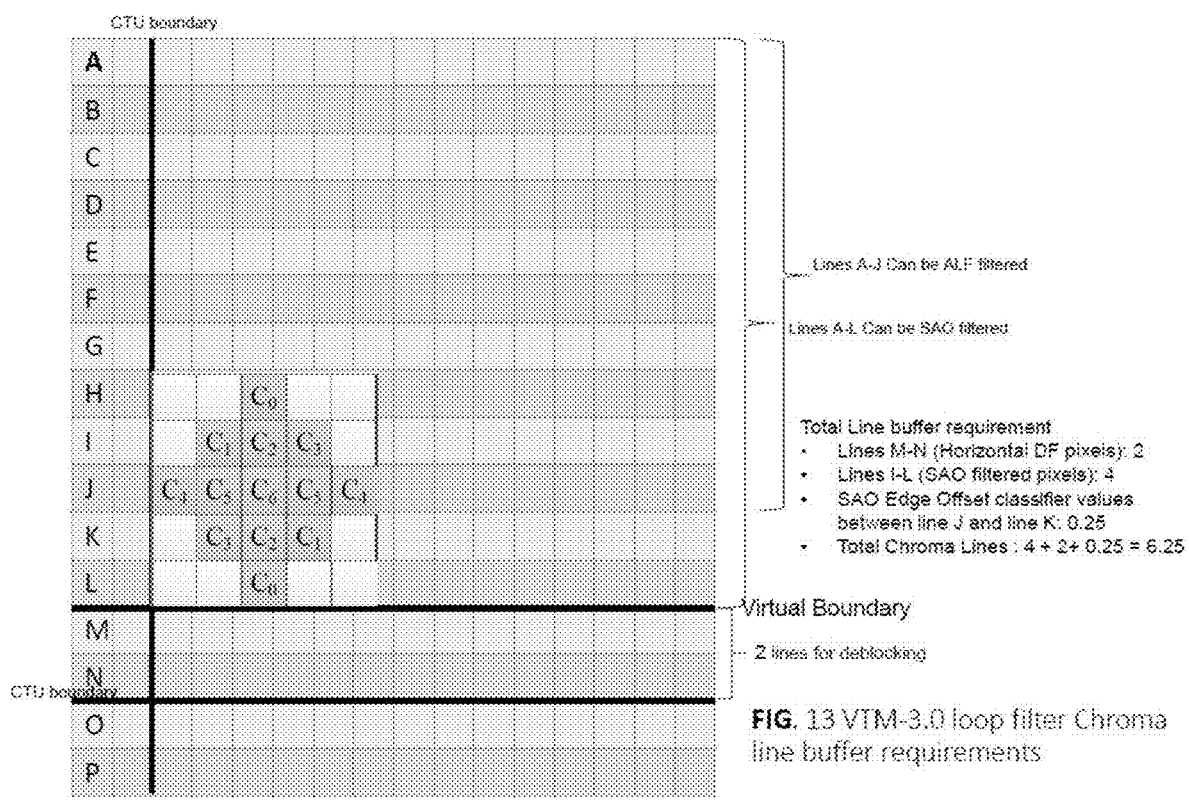

FIG. 14 Modified ALF filter for Chroma
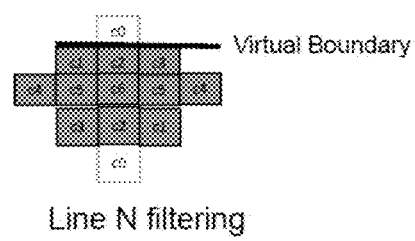
Line N filtering
Solution 1 :
$c2' = c2 + c0$
Solution 2 :
$c6' = c6 + 2 * c0$
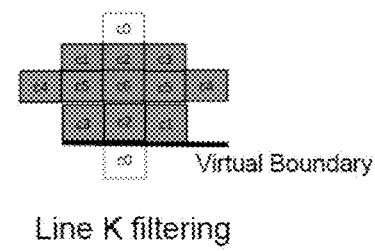
Line K filtering
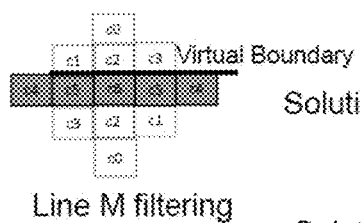
Line M filtering
Solution 1 :
$c5' = c5 + c1 + c3$
$c6' = c6 + 2 * c2 + 2 * c0$
Solution 2 :
$c6' = c6 + 2 * c0 + 2 * c1 + 2 * c2 + 2 * c3$
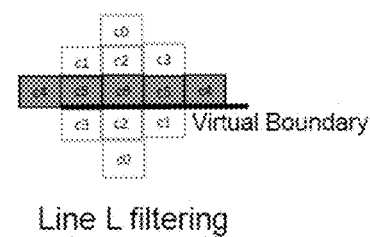
Line L filtering

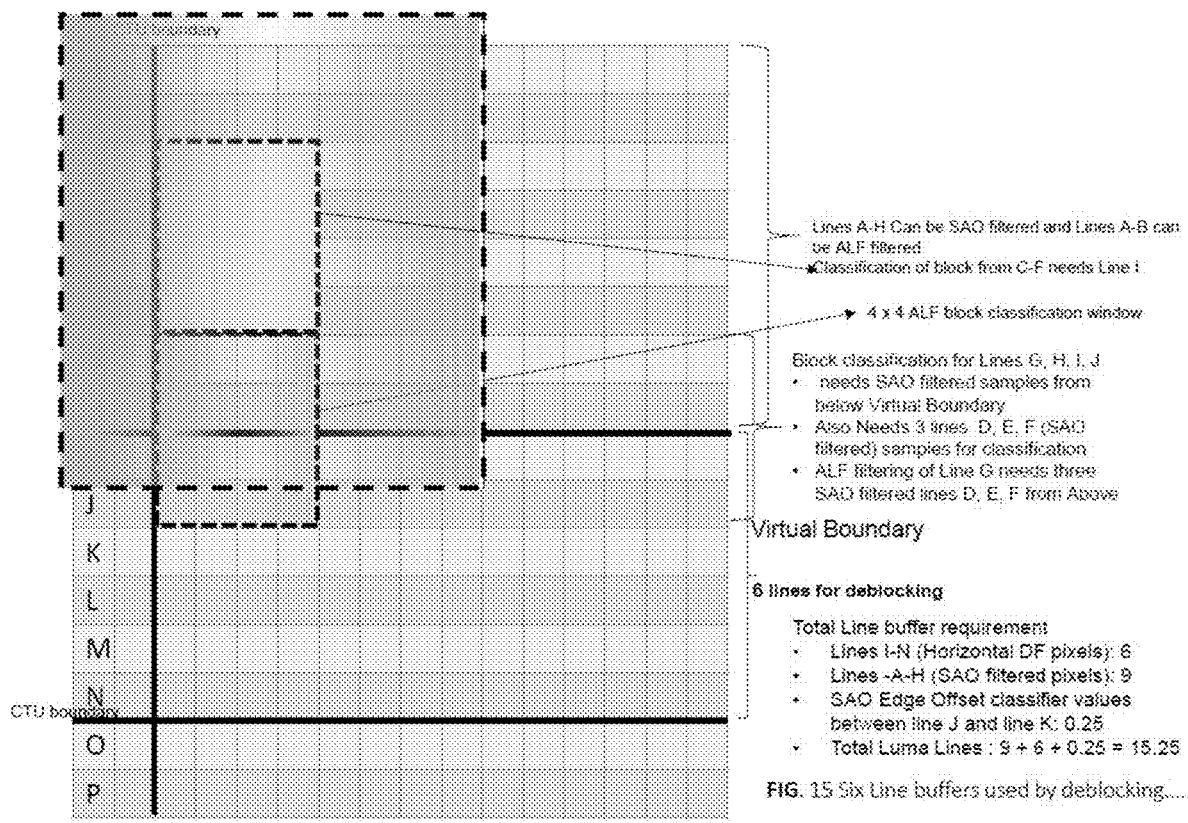

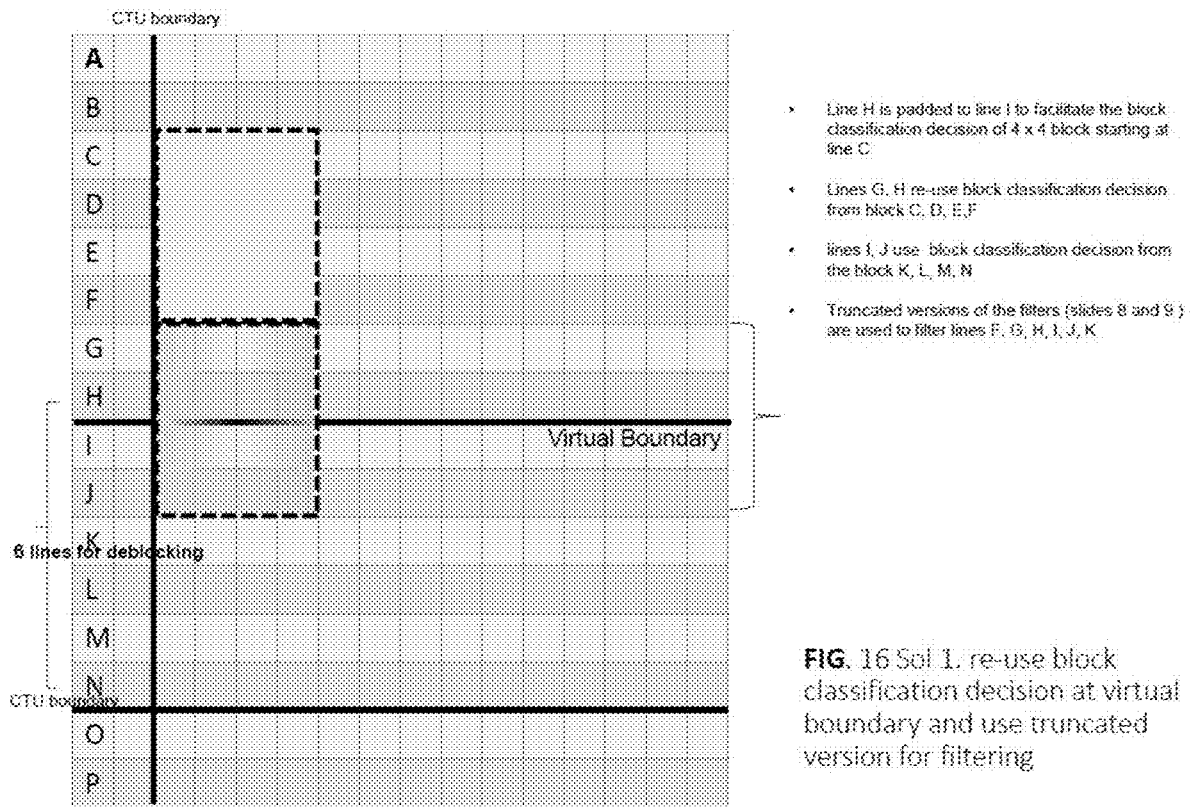
FIG. 16 Sol 1: re-use block classification decision at virtual boundary and use truncated version for filtering

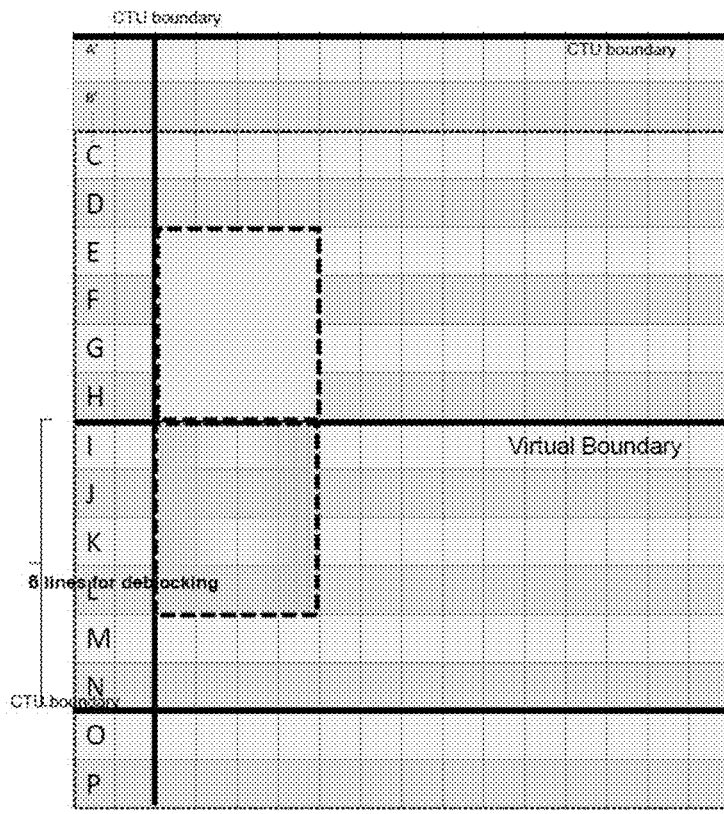
FIG. 17 Solution 2: Grid shifting approach for 6 lines case

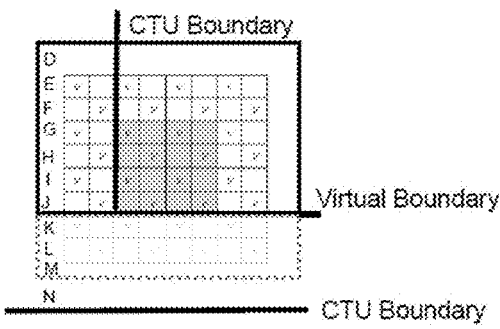
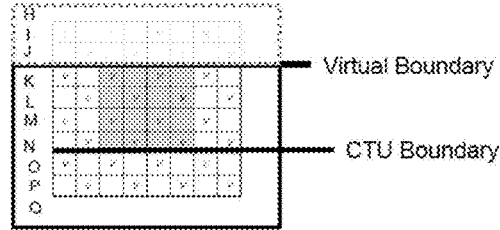

FIG. 18A  FIG. 18B

For block classification of 4 x 4 block immediate above VB (left figure):
- Only use samples above VB in classification (samples in lines E till H)
  - Line I and J are considered together in VTM-3.0, therefore only till line H are used.
  - Pad line J to line K to also use Lines I and J in classification For block classification of 4 x 4 block immediate below VB (right figure):
- Only use samples below VB in classification (samples in lines P till M)
  - Line K and L are considered together in VTM-3.0, therefore only till line M are used.
  - Pad line K to line J to also use Lines I and J in classification FIG. 19A Modified ALF filter to avoid ALF Luma Line Buffers
* For ALF filtering of lines H, I, J (above virtual boundary) and lines K, L, M (below virtual boundary) filtering is disabled in certain conditions:

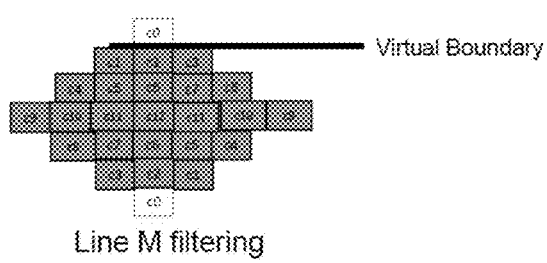

Line M filtering

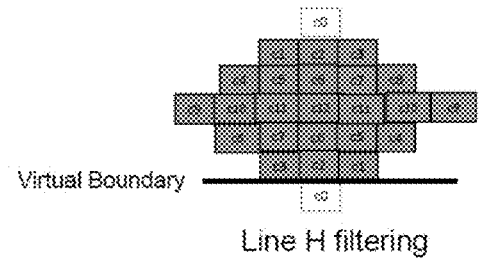

Line H filtering

For lines M, H, if $(2 * abs(c0)) > T * (2 * (abs(c1) + abs(c2) + abs(c3) + abs(c4) + abs(c5) + abs(c6) + abs(c7) + abs(c8) + abs(c9) + abs(c10) + abs(c11)) + abs(c12)$, then disable filtering for lines M and line H, otherwise filter as per solution 1 mentioned in Fig. 12a

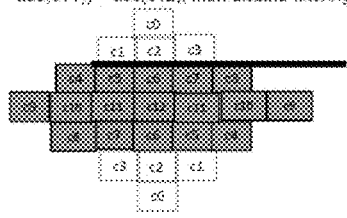

Line L filtering

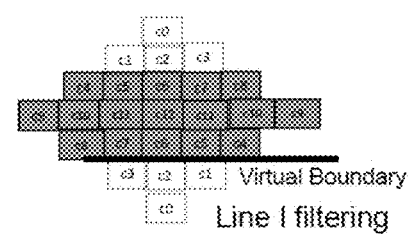

Line I filtering

For lines L, I, if $(2 * (abs(c0) + abs(c1) + abs(c2) + abs(c3))) > T * (2 * (abs(c4) + abs(c5) + abs(c6) + abs(c7) + abs(c8) + abs(c9) + abs(c10) + abs(c11)) + abs(c12)$, then disable filtering for lines L and line I, otherwise filter as per solution 1 mentioned in Fig. 12a

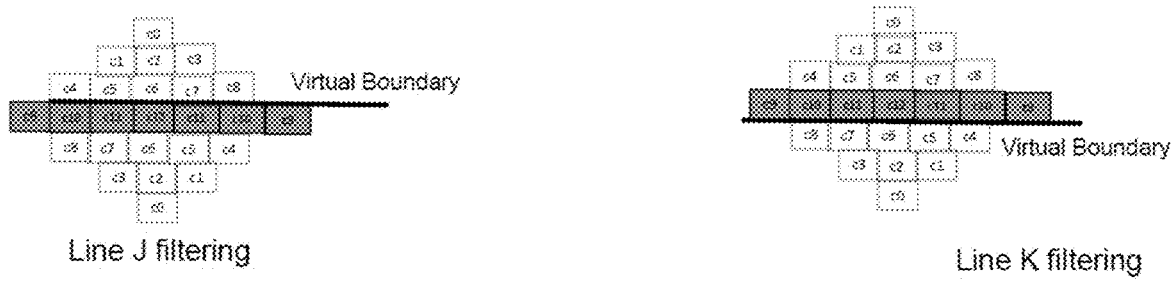
FIG. 19B Modified ALF filter to avoid ALF Luma Line Buffers
Line J filtering
Line K filtering
For lines J, K, if $(2 * (abs(c0) + abs(c1) + abs(c2) + abs(c3) + abs(c4) + abs(c5) + abs(c6) + abs(c7) + abs(c8)) > T * (2 * (abs(c9) + abs(c10) + abs(c11)) + abs(c12))$, then disable filtering for lines J and line K, otherwise filter as per solution 1 mentioned in Fig. 12a

FIG. 20 Modified ALF filter for Chroma

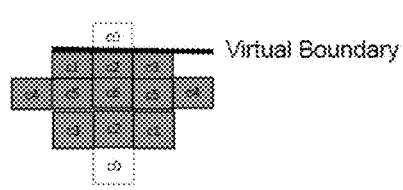

Line N filtering

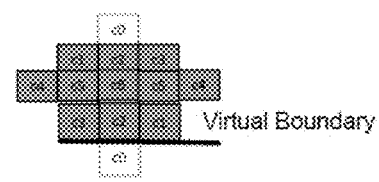

Line K filtering

For lines N, K, if (2 * (abs (c0)) > T * (2 * (abs(c1) + abs(c2) + abs(c3) + abs(c4) + abs(c5)) + abs(c6)), then disable filtering for lines N and line K, otherwise filter as per solution 1 mentioned in Fig. 14

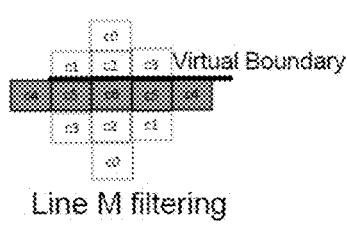

Line M filtering

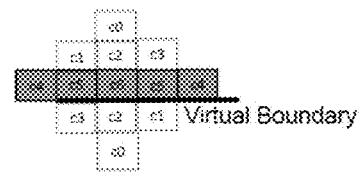

Line L filtering

For lines M, L, if (2 * (abs (c0) + abs(c1) + abs(c2) + abs(c3)) > T * (2 * (abs(c4) + abs(c5)) + abs(c6)), then disable filtering for lines M and line L, otherwise filter as per solution 1 mentioned in Fig. 14

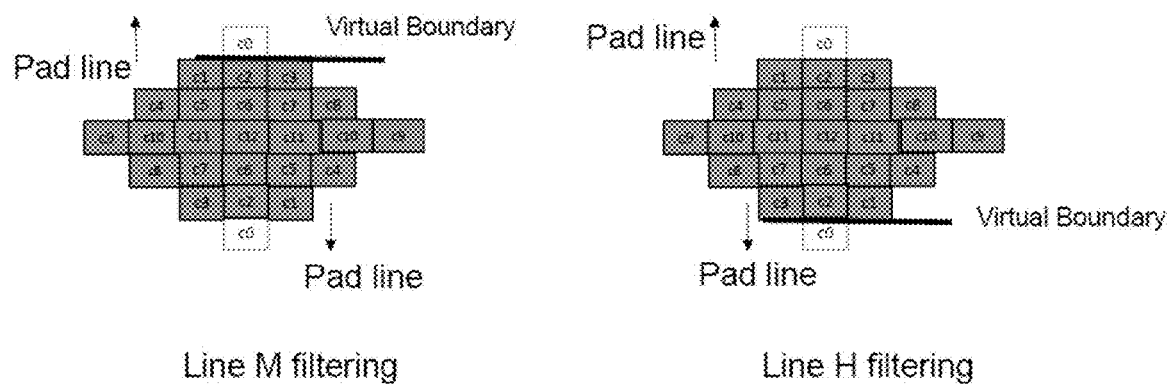
FIG. 21A Modified ALF filtering
- Symmetric padding at the virtual boundary
Line M filtering
Line H filtering

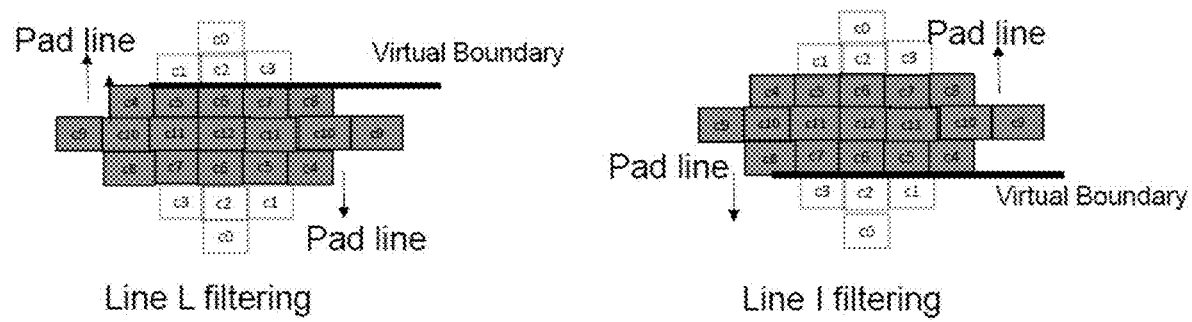
FIG. 21B Modified ALF filtering
• Symmetric padding at the virtual boundary
Line L filtering          Line I filtering

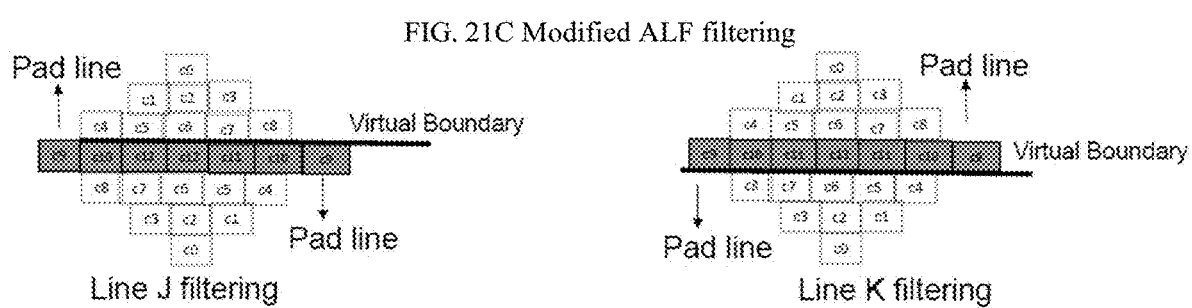

ENCODER, A DECODER AND CORRESPONDING METHODS USING AN ADAPTIVE LOOP FILTER

CROSS-REFERENCE TO RELATED APPLICATIONS

This application is a continuation of U.S. patent application Ser. No. 18/071,578, filed on Nov. 29, 2022, which is a continuation of U.S. patent application Ser. No. 17/356,047, filed on Jun. 23, 2021, now U.S. Pat. No. 11,523,111 which is a continuation of International Application No. PCT/CN2019/127535, filed on Dec. 23, 2019. The International Application claims priority to U.S. Application No. 62/784,535, filed on Dec. 23, 2018 and United States Patent Application No. 62/787,735, filed on Jan. 2, 2019, and U.S. Patent Application No. 62/822,979, filed on Mar. 24, 2019. All of the aforementioned patent applications are hereby incorporated by reference in their entireties.

TECHNICAL FIELD

Embodiments of the present disclosure generally relate to the field of picture processing and more particularly to filtering samples of adjoining blocks in a picture.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in picture quality are desirable.

SUMMARY

Embodiments of the present application provide apparatuses and methods for encoding and decoding according to the independent claims.

The foregoing and other objects are achieved by the subject matter of the independent claims. Further implementation forms are apparent from the dependent claims, the description and the figures.

The present disclosure provides a method of filtering a sample value of a picture, the picture comprising a first block and a second block, the first block and the second block adjoining each other in a block boundary, wherein the picture comprises at least n×m (n times m) samples $p(i,j)$ arranged in n rows and m columns, wherein i is a row index that runs from 1 to n and j is a column index that runs from 1 to m, wherein samples $p(i,j)$ with i from 1 to k belong to the first block and samples with i from k+1 to n belong to the second block, wherein k is an integer number less than n, wherein the method comprises, with an integer t that is less than k and with an integer j in the range of 1 to m: generating, with an integer i in the range of 1 to k-t-1, a filtered sample value by applying a filter to the value of the sample $p(i,j)$, wherein the filter is supported by a set of filter support samples, wherein the set of filter support samples comprises the sample $p(i,j)$ and one or more further samples, wherein the set of filter support samples does not comprise any samples $p(i',j')$ with row index i' greater than k-t-1, and/or generating, with an integer i in the range of k-t to k, a filtered sample value by applying a filter to the value of the sample $p(i,j)$, wherein the filter is supported by a set of filter support samples, wherein the set of filter support samples comprises the sample $p(i,j)$ and one or more further samples, wherein the set of filter support samples does not comprise any samples $p(i',j')$ with row index i' less than k-t.

The filter support samples are those samples whose values determine the filtered value of the sample to which the filter is applied. For example, the filtered sample value may be a weighted sum of the values of the filter support samples. The filter can be a filter in a mathematical sense and can thus be implemented purely in software. The block boundary can be located between row k and row k+1.

The present disclosure further provides a method of filtering sample values of a picture, the picture comprising a first block and a second block, the first block and the second block adjoining each other in a block boundary, wherein the picture comprises at least n×m samples $p(i,j)$ arranged in n rows and m columns, wherein i is a row index that runs from 1 to n and j is a column index that runs from 1 to m, wherein samples $p(i,j)$ with i from 1 to k belong to the first block and samples with i from k+1 to n belong to the second block, wherein k is an integer number less than n, wherein the method comprises, with an integer t that is less than k and for each i from 1 to k, and each j from 1 to m: generating a filtered sample value by applying a filter to the value of sample $p(i,j)$, wherein the filter is supported by a set of filter support samples, wherein the set of filter support samples comprises the sample $p(i,j)$ and one or more further samples, wherein if i is in the range of 1 to k-t-1, the set of filter support samples does not comprise any samples $p(i',j')$ with row index i' greater than k-t-1, and wherein if i is in the range of k-t to k, the set of filter support samples does not comprise any samples $p(i',j')$ with row index i' less than k-t.

According to an embodiment, the first block may be a first coding tree unit, CTU, and the second block may be a second CTU.

The value of t may be 2, 3, 4, 5 or 6. In an exemplary embodiment, t may be 4.

According to another embodiment, for each i in the range of 1 to k-t-1 and for each j from 1 to m, the set of filter support samples may comprise multiple samples $p(i',j')$ with i' in the range of 1 to k-t-1; and for each i in the range of k-t to k and for each j from 1 to m, the set of filter support samples may comprise multiple samples $p(i',j')$ with i' equal to or greater than k-t.

This can be further developed in that for each i in the range of k-t to k and for each j from 1 to m, the set of filter support samples may further comprise one or more samples $p(i',j')$ with i' greater than k. Accordingly, in this development the set of filter support samples for pixel p(i,j) may comprise one or more samples from the second block, if i is in the range of k-t to k.

The filter may be an in-loop filter. Alternatively or additionally the filter may comprise a deblocking filter.

According to another embodiment, the filter may comprise a deblocking filter, a sample adaptive offset filter, SAO, and an adaptive loop filter, ALF, wherein the SAO is applied after the deblocking filter, and the ALF is applied after the SAO.

According to an embodiment, the method may comprise: determining sample values of the first block; applying the filter to the sample values of the first block in rows 1 to k-t-1; storing the sample values of the first block from rows k-t to k in a buffer; determining sample values of the second block; and applying the filter to the sample values of the first block in rows k-t that have been stored the buffer.

In another embodiment, the filter may be an adaptive loop filter, and the adaptive filter may be determined by using a classification step which accesses samples of the current block and also samples surrounding the block. Thus, the filter may not be a fixed filter. An average of all samples in the current block and also in the neighborhood of the give block may be used for the classification step; and in an example, in case some samples surrounding the block are non-available, then a different normalization value may be used to classify the current block as described below.

According to an exemplary embodiment, when samples surrounding the block are not available, the adaptive filter may be determined by using a normalization value, wherein the normalization value may be a positive integer value and may be dependent on the number of accessible samples surrounding a given block. The normalization value may have an inverse relationship with the number of accessible samples.

In an example, neighborhood samples are required for the classification. Alternatively, if some of neighborhood samples are not available, a different normalization may be used. In an example, normalization is performed all the time: Case (1) when all samples are available around the block are available. Case (2) when some samples are not available. In Case (1): In this case one normalization may be used. This may corresponds to an averaging. If more samples are available, then a sum of all samples may be taken and divided by the total number of samples. In Case (2): If less samples are available, then the sum may be done only for the available samples, and then may only be divided by the number of available samples. Accordingly, the normalization factor may change based on the number of samples available. In an example, the normalization value may increase when the number of available samples decreases.

According to an exemplary embodiment, the normalization value may be 96, when not all the samples surrounding the block are available. Thus, this may correspond to the case when at least one sample surrounding the block is not available. Alternatively or additionally, the normalization value may be 64, when all the samples surrounding the block are available.

According to an embodiment, the filter may be an adaptive loop filter.

According to another embodiment, a symmetric padding operation may be applied when required samples are not accessible for filtering a given sample. According to an exemplary embodiment, the symmetric padding operation is defined as replacing the unavailable samples by immediate neighboring samples which are available for filtering operation. Alternatively or additionally, the symmetric padding operation may be defined as a method that the filter is made symmetric by applying the padding operation on both sides of the filter even though on one side, the filter samples can still be accessible.

According to an embodiment, the picture may be included in a frame of a video sequence.

According to another embodiment, the method may be performed to encode or decode the picture, or performed to encode or decode a video sequence that comprises the picture.

The present disclosure further provides an encoder comprising processing circuitry for carrying out a method according to the present disclosure and a decoder comprising processing circuitry for carrying out a method according to the present disclosure.

The present disclosure also provides a computer program comprising a program code for performing a method according to the present disclosure.

The present disclosure further provides a decoder, comprising: one or more processors; and a non-transitory computer-readable storage medium coupled to the processors and storing programming for execution by the processors, wherein the programming, when executed by the processors, configures the decoder to carry out a method according to the present disclosure.

The present disclosure further provides an encoder, comprising: one or more processors; and a non-transitory computer-readable storage medium coupled to the processors and storing programming for execution by the processors, wherein the programming, when executed by the processors, configures the encoder to carry out a method according to the present disclosure.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which:

FIGS. 6 to 22 schematically illustrate examples of embodiments of the invention.

Figure 1A:
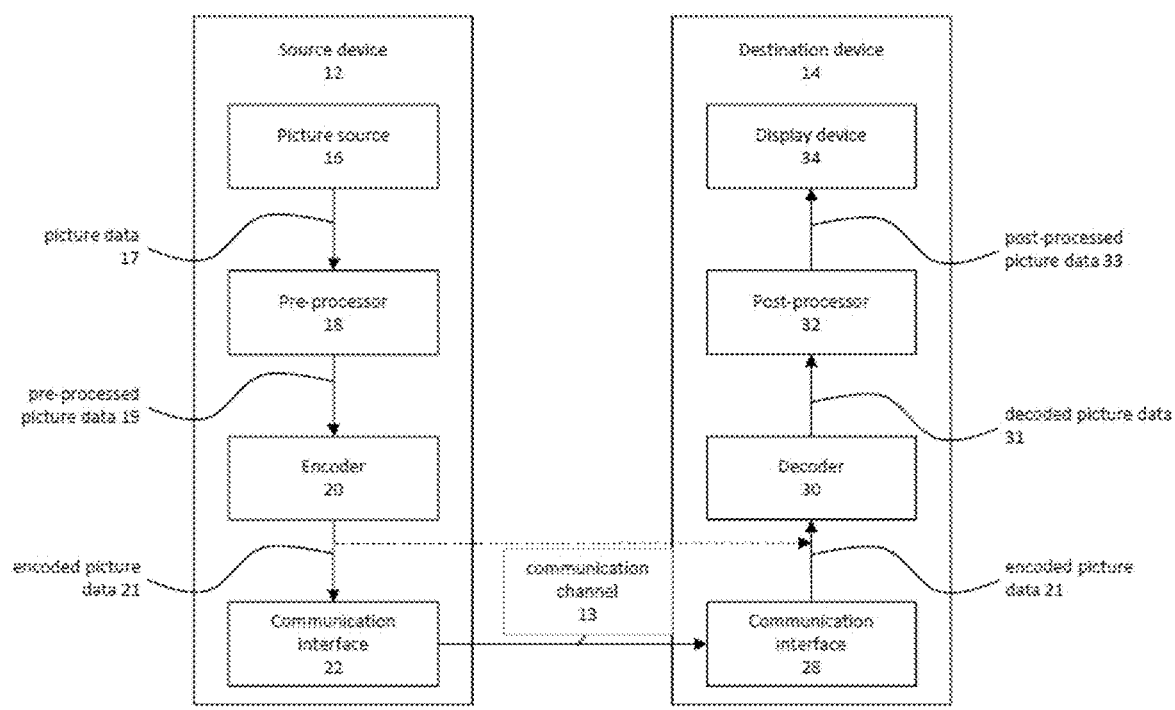
FIG. 1A is a block diagram showing an example of a video coding system configured to implement embodiments of the invention.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g., functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Video coding typically refers to the processing of a sequence of pictures, which form the video or video sequence. Instead of the term "picture" the term "frame" or "image" may be used as synonyms in the field of video coding. Video coding (or coding in general) comprises two parts video encoding and video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general) shall be understood to relate to "encoding" or "decoding" of video pictures or respective video sequences. The combination of the encoding part and the decoding part is also referred to as CODEC (Coding and Decoding).

In case of lossless video coding, the original video pictures can be reconstructed, i.e., the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e. the quality of the reconstructed video pictures is lower or worse compared to the quality of the original video pictures.

Several video coding standards belong to the group of "lossy hybrid video codecs" (i.e. combine spatial and temporal prediction in the sample domain and 2D transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g., by using spatial (intra picture) prediction and/or temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is applied to the encoded or compressed block to reconstruct the current block for representation. Furthermore, the encoder duplicates the decoder processing loop such that both will generate identical predictions (e.g., intra- and inter predictions) and/or re-constructions for processing, i.e. coding, the subsequent blocks.

In the following embodiments of a video coding system 10, a video encoder 20 and a video decoder 30 are described based on FIGS. 1 to 3.

FIG. 1A is a schematic block diagram illustrating an example coding system 10, e.g., a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

As shown in FIG. 1A, the coding system 10 comprises a source device 12 configured to provide encoded picture data 21 e.g., to a destination device 14 for decoding the encoded picture data 13.

The source device 12 comprises an encoder 20, and may additionally, i.e. optionally, comprise a picture source 16, a pre-processor (or pre-processing unit) 18, e.g., a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g., a screen content, a virtual reality (VR) picture) and/or any combination thereof (e.g., an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17. Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g., from RGB to YCbCr), color correction, or de-noising. It can be understood that the pre-processing unit 18 may be optional component.

The video encoder 20 is configured to receive the pre-processed picture data 19 and provide encoded picture data 21 (further details will be described below, e.g., based on FIG. 2). Communication interface 22 of the source device 12 may be configured to receive the encoded picture data 21 and to transmit the encoded picture data 21 (or any further processed version thereof) over communication channel 13 to another device, e.g., the destination device 14 or any other device, for storage or direct reconstruction.

The destination device 14 comprises a decoder 30 (e.g., a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g., directly from the source device 12 or from any other source, e.g., a storage device, e.g., an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, e.g., a wired or wireless network or any combination thereof, or any kind of private and public network, or any kind of combination thereof.

The communication interface 22 may be, e.g., configured to package the encoded picture data 21 into an appropriate format, e.g., packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 1A pointing from the source device 12 to the destination device 14, or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g., the decoded picture 31, to obtain post-processed picture data 33, e.g., a post-processed picture 33. The post-processing performed by the post-processing unit 32 may comprise, e.g., color format conversion (e.g., from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g., an integrated or external display or monitor. The displays may, e.g., comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

Figure 1B:
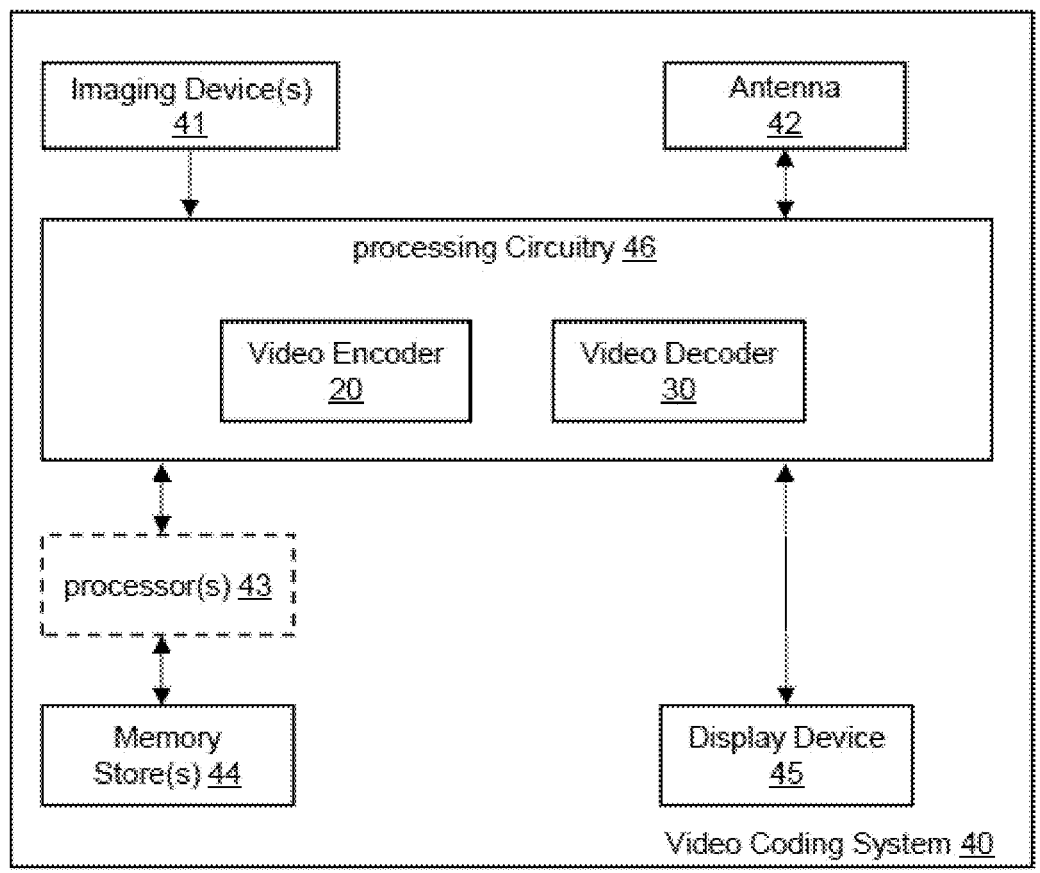
FIG. 1B is a block diagram showing another example of a video coding system configured to implement embodiments of the invention.

The encoder 20 (e.g., a video encoder 20) or the decoder 30 (e.g., a video decoder 30) or both encoder 20 and decoder 30 may be implemented via processing circuitry as shown in FIG. 1, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 2 and/or any other encoder system or subsystem described herein. The decoder 30 may be implemented via processing circuitry 46 to embody the various modules as discussed with respect to decoder 30 of FIG. 3 and/or any other decoder system or subsystem described herein. The processing circuitry may be configured to perform the various operations as discussed later. As shown in FIG. 5, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 1B.

Source device 12 and destination device 14 may comprise any of a wide range of devices, including any kind of handheld or stationary devices, e.g., notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Encoder and Encoding Method

Figure 2:
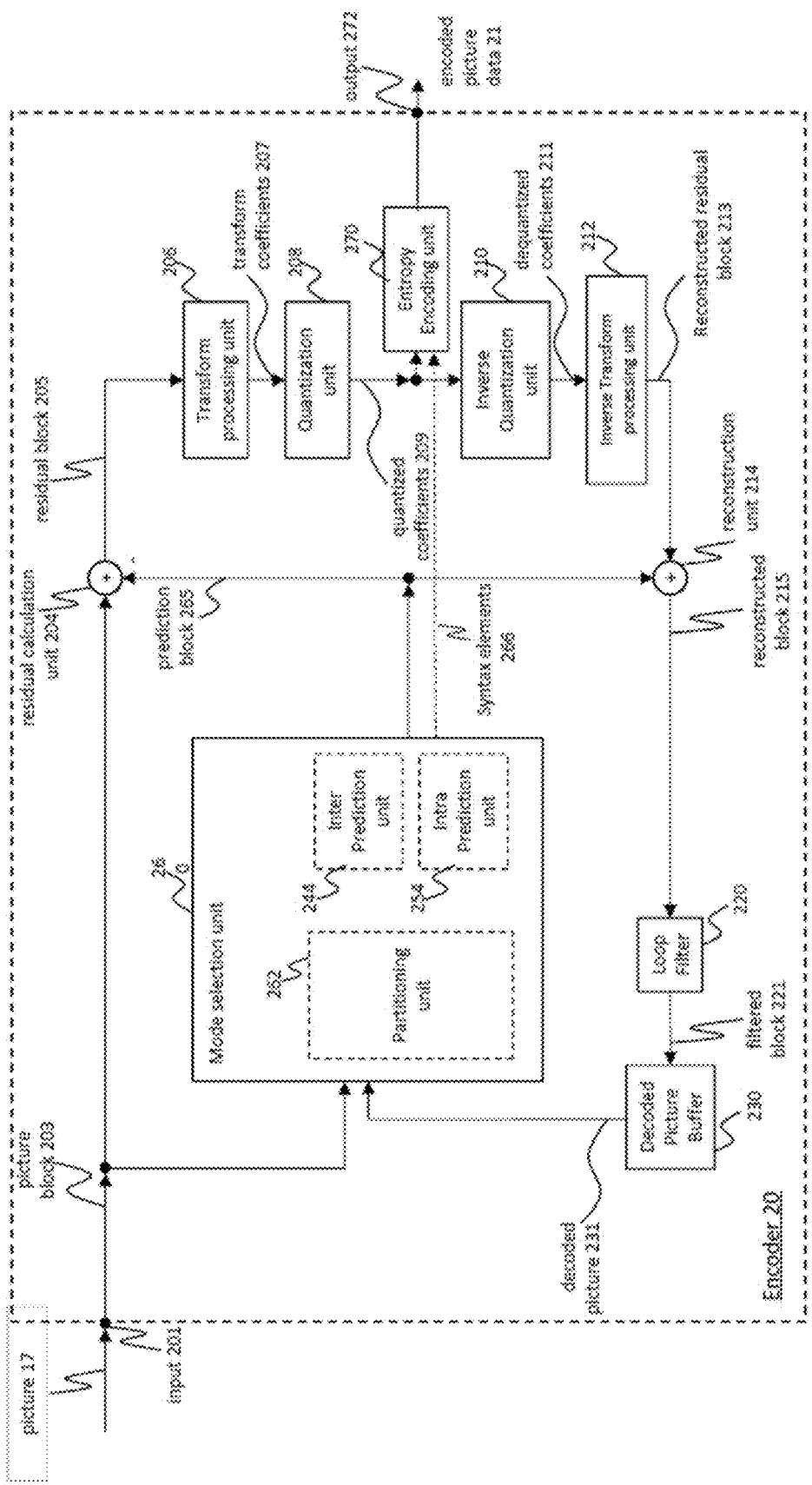
FIG. 2 is a block diagram showing an example of a video encoder configured to implement embodiments of the invention.

FIG. 2 shows a schematic block diagram of an example video encoder 20 that is configured to implement the techniques of the present application. In the example of FIG. 2, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254 and a partitioning unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

Figure 3:
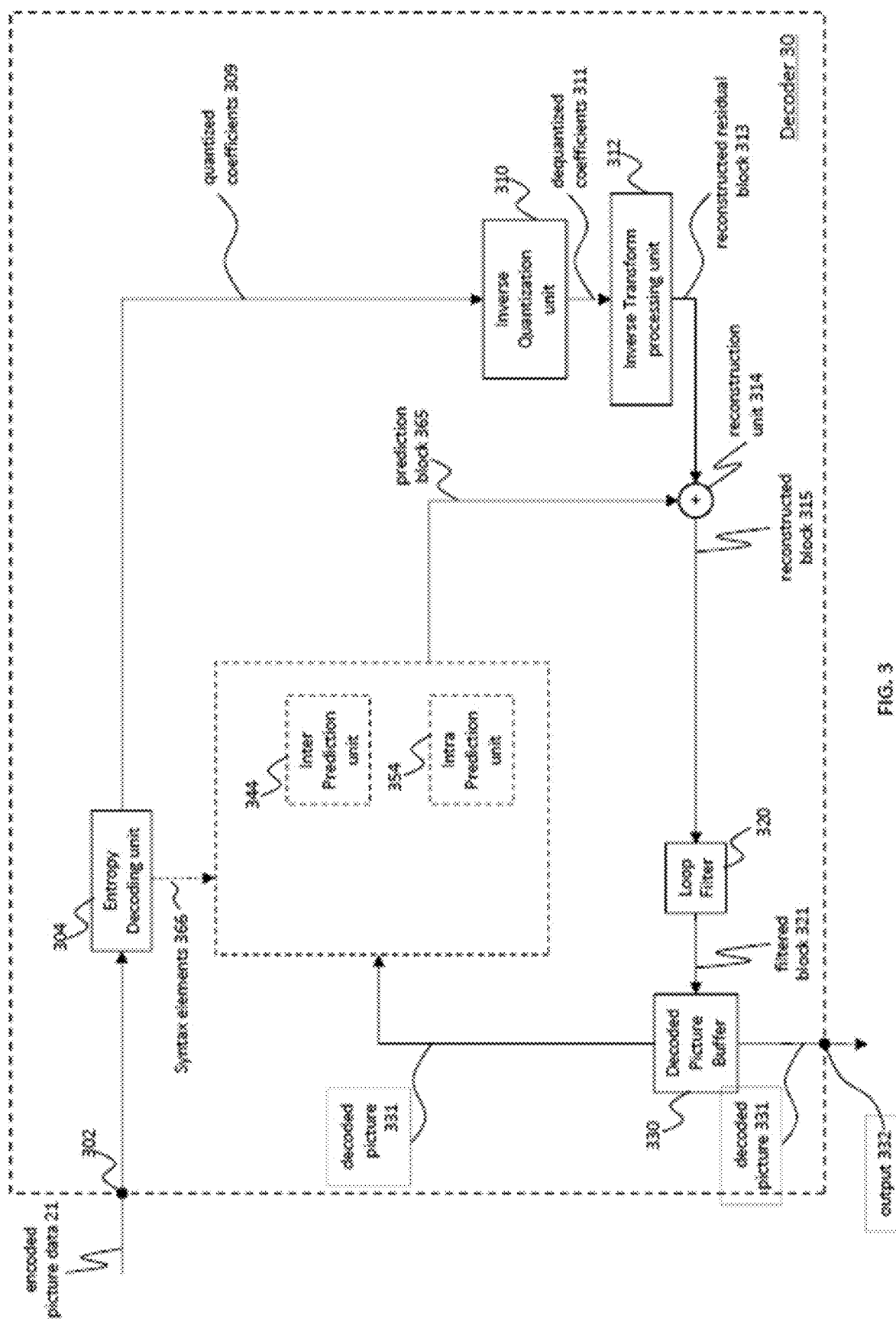
FIG. 3 is a block diagram showing an example structure of a video decoder configured to implement embodiments of the invention.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

Pictures & Picture Partitioning (Pictures & Blocks)

The encoder 20 may be configured to receive, e.g., via input 201, a picture 17 (or picture data 17), e.g., picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g., previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g., YCbCr, which comprises a luminance component indicated by Y (sometimes also L is used instead) and two chrominance components indicated by Cb and Cr. The luminance (or short luma) component Y represents the brightness or grey level intensity (e.g., like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 may comprise a picture partitioning unit (not depicted in FIG. 2) configured to partition the picture 17 into a plurality of (typically non-overlapping) picture blocks 203. These blocks may also be referred to as root blocks, macro blocks (H.264/AVC) or coding tree blocks (CTB) or coding tree units (CTU) (H.265/HEVC and VVC). The picture partitioning unit may be configured to use the same block size for all pictures of a video sequence and the corresponding grid defining the block size, or to change the block size between pictures or subsets or groups of pictures, and partition each picture into the corresponding blocks.

In further embodiments, the video encoder may be configured to receive directly a block 203 of the picture 17, e.g., one, several or all blocks forming the picture 17. The picture block 203 may also be referred to as current picture block or picture block to be coded.

Like the picture 17, the picture block 203 again is or can be regarded as a two-dimensional array or matrix of samples with intensity values (sample values), although of smaller dimension than the picture 17. In other words, the block 203 may comprise, e.g., one sample array (e.g., a luma array in case of a monochrome picture 17, or a luma or chroma array in case of a color picture) or three sample arrays (e.g., a luma and two chroma arrays in case of a color picture 17) or any other number and/or kind of arrays depending on the color format applied. The number of samples in horizontal and vertical direction (or axis) of the block 203 define the size of block 203. Accordingly, a block may, for example, an M×N (M-column by N-row) array of samples, or an M×N array of transform coefficients.

Embodiments of the video encoder 20 as shown in FIG. 2 may be configured encode the picture 17 block by block, e.g., the encoding and prediction is performed per block 203.

Residual Calculation

The residual calculation unit 204 may be configured to calculate a residual block 205 (also referred to as residual 205) based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform

The transform processing unit 206 may be configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g., by inverse transform processing unit 212 (and the corresponding inverse transform, e.g., by inverse transform processing unit 312 at video decoder 30) and corresponding scaling factors for the forward transform, e.g., by transform processing unit 206, at an encoder 20 may be specified accordingly.

Embodiments of the video encoder 20 (respectively transform processing unit 206) may be configured to output transform parameters, e.g., a type of transform or transforms, e.g., directly or encoded or compressed via the entropy encoding unit 270, so that, e.g., the video decoder 30 may receive and use the transform parameters for decoding.

Quantization

The quantization unit 208 may be configured to quantize the transform coefficients 207 to obtain quantized coefficients 209, e.g., by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g., by inverse quantization unit 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

Embodiments of the video encoder 20 (respectively quantization unit 208) may be configured to output quantization parameters (QP), e.g., directly or encoded via the entropy encoding unit 270, so that, e.g., the video decoder 30 may receive and apply the quantization parameters for decoding.

Inverse Quantization

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

Inverse Transform

The inverse transform processing unit 212 is configured to apply the inverse transform of the transform applied by the transform processing unit 206, e.g., an inverse discrete cosine transform (DCT) or inverse discrete sine transform (DST) or other inverse transforms, to obtain a reconstructed residual block 213 (or corresponding dequantized coefficients 213) in the sample domain. The reconstructed residual block 213 may also be referred to as transform block 213.

Reconstruction

The reconstruction unit 214 (e.g., adder or summer 214) is configured to add the transform block 213 (i.e. reconstructed residual block 213) to the prediction block 265 to obtain a reconstructed block 215 in the sample domain, e.g., by adding—sample by sample—the sample values of the reconstructed residual block 213 and the sample values of the prediction block 265.

Filtering

The loop filter unit 220 (or short "loop filter" 220), is configured to filter the reconstructed block 215 to obtain a filtered block 221, or in general, to filter reconstructed samples to obtain filtered samples. The loop filter unit is, e.g., configured to smooth pixel transitions, or otherwise improve the video quality. The loop filter unit 220 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 220 is shown in FIG. 2 as being an in loop filter, in other configurations, the loop filter unit 220 may be implemented as a post loop filter. The filtered block 221 may also be referred to as filtered reconstructed block 221.

Embodiments of the video encoder 20 (respectively loop filter unit 220) may be configured to output loop filter parameters (such as sample adaptive offset information), e.g., directly or encoded via the entropy encoding unit 270, so that, e.g., a decoder 30 may receive and apply the same loop filter parameters or respective loop filters for decoding.

Decoded Picture Buffer

The decoded picture buffer (DPB) 230 may be a memory that stores reference pictures, or in general reference picture data, for encoding video data by video encoder 20. The DPB 230 may be formed by any of a variety of memory devices, such as dynamic random access memory (DRAM), including synchronous DRAM (SDRAM), magnetoresistive RAM (MRAM), resistive RAM (RRAM), or other types of memory devices. The decoded picture buffer (DPB) 230 may be configured to store one or more filtered blocks 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e. decoded, pictures (and corresponding reference blocks and samples) and/or a partially reconstructed current picture (and corresponding reference blocks and samples), for example for inter prediction. The decoded picture buffer (DPB) 230 may be also configured to store one or more unfiltered reconstructed blocks 215, or in general unfiltered reconstructed samples, e.g., if the reconstructed block 215 is not filtered by loop filter unit 220, or any other further processed version of the reconstructed blocks or samples.

Mode Selection (Partitioning & Prediction)

The mode selection unit 260 comprises partitioning unit 262, inter-prediction unit 244 and intra-prediction unit 254, and is configured to receive or obtain original picture data, e.g., an original block 203 (current block 203 of the current picture 17), and reconstructed picture data, e.g., filtered and/or unfiltered reconstructed samples or blocks of the same (current) picture and/or from one or a plurality of previously decoded pictures, e.g., from decoded picture buffer 230 or other buffers (e.g., line buffer, not shown). The reconstructed picture data is used as reference picture data for prediction, e.g., inter-prediction or intra-prediction, to obtain a prediction block 265 or predictor 265.

Mode selection unit 260 may be configured to determine or select a partitioning for a current block prediction mode (including no partitioning) and a prediction mode (e.g., an intra or inter prediction mode) and generate a corresponding prediction block 265, which is used for the calculation of the residual block 205 and for the reconstruction of the reconstructed block 215.

Embodiments of the mode selection unit 260 may be configured to select the partitioning and the prediction mode (e.g., from those supported by or available for mode selection unit 260), which provide the best match or in other words the minimum residual (minimum residual means better compression for transmission or storage), or a minimum signaling overhead (minimum signaling overhead means better compression for transmission or storage), or which considers or balances both. The mode selection unit 260 may be configured to determine the partitioning and prediction mode based on rate distortion optimization (RDO), i.e. select the prediction mode which provides a minimum rate distortion. Terms like "best", "minimum", "optimum" etc. in this context do not necessarily refer to an overall "best", "minimum", "optimum", etc. but may also refer to the fulfillment of a termination or selection criterion like a value exceeding or falling below a threshold or other constraints leading potentially to a "sub-optimum selection" but reducing complexity and processing time.

In other words, the partitioning unit 262 may be configured to partition the block 203 into smaller block partitions or sub-blocks (which form again blocks), e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes are applied to each of the block partitions or sub-blocks.

In the following the partitioning (e.g., by partitioning unit 260) and prediction processing (by inter-prediction unit 244 and intra-prediction unit 254) performed by an example video encoder 20 will be explained in more detail.

Partitioning

The partitioning unit 262 may partition (or split) a current block 203 into smaller partitions, e.g., smaller blocks of square or rectangular size. These smaller blocks (which may also be referred to as sub-blocks) may be further partitioned into even smaller partitions. This is also referred to tree-partitioning or hierarchical tree-partitioning, wherein a root block, e.g., at root tree-level 0 (hierarchy-level 0, depth 0), may be recursively partitioned, e.g., partitioned into two or more blocks of a next lower tree-level, e.g., nodes at tree-level 1 (hierarchy-level 1, depth 1), wherein these blocks may be again partitioned into two or more blocks of a next lower level, e.g., tree-level 2 (hierarchy-level 2, depth 2), etc. until the partitioning is terminated, e.g., because a termination criterion is fulfilled, e.g., a maximum tree depth or minimum block size is reached. Blocks which are not further partitioned are also referred to as leaf-blocks or leaf nodes of the tree. A tree using partitioning into two partitions is referred to as binary-tree (BT), a tree using partitioning into three partitions is referred to as ternary-tree (TT), and a tree using partitioning into four partitions is referred to as quad-tree (QT).

As mentioned before, the term "block" as used herein may be a portion, in particular a square or rectangular portion, of a picture. With reference, for example, to HEVC and VVC, the block may be or correspond to a coding tree unit (CTU), a coding unit (CU), prediction unit (PU), and transform unit (TU) and/or to the corresponding blocks, e.g., a coding tree block (CTB), a coding block (CB), a transform block (TB) or prediction block (PB).

For example, a coding tree unit (CTU) may be or comprise a CTB of luma samples, two corresponding CTBs of chroma samples of a picture that has three sample arrays, or a CTB of samples of a monochrome picture or a picture that is coded using three separate colour planes and syntax structures used to code the samples. Correspondingly, a coding tree block (CTB) may be an N×N block of samples for some value of N such that the division of a component into CTBs is a partitioning. A coding unit (CU) may be or comprise a coding block of luma samples, two corresponding coding blocks of chroma samples of a picture that has three sample arrays, or a coding block of samples of a monochrome picture or a picture that is coded using three separate colour planes and syntax structures used to code the samples. Correspondingly a coding block (CB) may be an M×N block of samples for some values of M and N such that the division of a CTB into coding blocks is a partitioning.

In embodiments, e.g., according to HEVC, a coding tree unit (CTU) may be split into CUs by using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU.

In embodiments, e.g., according to the latest video coding standard currently in development, which is referred to as Versatile Video Coding (VVC), Quad-tree and binary tree (QTBT) partitioning is used to partition a coding block. In the QTBT block structure, a CU can have either a square or rectangular shape. For example, a coding tree unit (CTU) is first partitioned by a quadtree structure. The quadtree leaf nodes are further partitioned by a binary tree or ternary (or triple) tree structure. The partitioning tree leaf nodes are called coding units (CUs), and that segmentation is used for motion prediction and transform processing without any further partitioning. This means that the CU, PU and TU have the same block size in the QTBT coding block structure. In parallel, multiple partition, for example, triple tree partition was also proposed to be used together with the QTBT block structure.

In one example, the mode selection unit 260 of video encoder 20 may be configured to perform any combination of the partitioning techniques described herein.

As described above, the video encoder 20 is configured to determine or select the best or an optimum prediction mode from a set of (pre-determined) prediction modes. The set of prediction modes may comprise, e.g., intra-prediction modes and/or inter-prediction modes.

Intra-Prediction

The set of intra-prediction modes may comprise 35 different intra-prediction modes, e.g., non-directional modes like DC (or mean) mode and planar mode, or directional modes, e.g., as defined in HEVC, or may comprise 67 different intra-prediction modes, e.g., non-directional modes like DC (or mean) mode and planar mode, or directional modes, e.g., as defined for VVC.

The intra-prediction unit 254 is configured to use reconstructed samples of neighboring blocks of the same current picture to generate an intra-prediction block 265 according to an intra-prediction mode of the set of intra-prediction modes.

The intra prediction unit 254 (or in general the mode selection unit 260) is further configured to output intra-prediction parameters (or in general information indicative of the selected intra prediction mode for the block) to the entropy encoding unit 270 in form of syntax elements 266 for inclusion into the encoded picture data 21, so that, e.g., the video decoder 30 may receive and use the prediction parameters for decoding.

Inter-Prediction

The set of (or possible) inter-prediction modes depends on the available reference pictures (i.e. previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied. The inter prediction unit 244 may include a motion estimation (ME) unit and a motion compensation (MC) unit (both not shown in FIG. 2). The motion estimation unit may be configured to receive or obtain the picture block 203 (current picture block 203 of the current picture 17) and a decoded picture 231, or at least one or a plurality of previously reconstructed blocks, e.g., reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index) and/or an offset (spatial offset) between the position (x, y coordinates) of the reference block and the position of the current block as inter prediction parameters to the motion estimation unit. This offset is also called motion vector (MV).

The motion compensation unit is configured to obtain, e.g., receive, an inter prediction parameter and to perform inter prediction based on or using the inter prediction parameter to obtain an inter prediction block 265. Motion compensation, performed by the motion compensation unit, may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit may locate the prediction block to which the motion vector points in one of the reference picture lists.

Motion compensation unit may also generate syntax elements associated with the blocks and the video slice for use by video decoder 30 in decoding the picture blocks of the video slice.

Entropy Coding

The entropy encoding unit 270 is configured to apply, for example, an entropy encoding algorithm or scheme (e.g., a variable length coding (VLC) scheme, an context adaptive VLC scheme (CAVLC), an arithmetic coding scheme, a binarization, a context adaptive binary arithmetic coding (CABAC), syntax-based context-adaptive binary arithmetic coding (SBAC), probability interval partitioning entropy (PIPE) coding or another entropy encoding methodology or technique) or bypass (no compression) on the quantized coefficients 209, inter prediction parameters, intra prediction parameters, loop filter parameters and/or other syntax elements to obtain encoded picture data 21 which can be output via the output 272, e.g., in the form of an encoded bitstream 21, so that, e.g., the video decoder 30 may receive and use the parameters for decoding. The encoded bitstream 21 may be transmitted to video decoder 30, or stored in a memory for later transmission or retrieval by video decoder 30.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

Decoder and Decoding Method

FIG. 3 shows an example of a video decoder 30 that is configured to implement the techniques of this present application. The video decoder 30 is configured to receive encoded picture data 21 (e.g., encoded bitstream 21), e.g., encoded by encoder 20, to obtain a decoded picture 331. The encoded picture data or bitstream comprises information for decoding the encoded picture data, e.g., data that represents picture blocks of an encoded video slice and associated syntax elements.

In the example of FIG. 3, the decoder 30 comprises an entropy decoding unit 304, an inverse quantization unit 310, an inverse transform processing unit 312, a reconstruction unit 314 (e.g., a summer 314), a loop filter 320, a decoded picture buffer (DBP) 330, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 2.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

Entropy Decoding

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 3), e.g., any or all of inter prediction parameters (e.g., reference picture index and motion vector), intra prediction parameter (e.g., intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode selection unit 360 and other parameters to other units of the decoder 30. Video decoder 30 may receive the syntax elements at the video slice level and/or the video block level.

Inverse Quantization

The inverse quantization unit 310 may be configured to receive quantization parameters (QP) (or in general information related to the inverse quantization) and quantized coefficients from the encoded picture data 21 (e.g., by parsing and/or decoding, e.g., by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice to determine a degree of quantization and, likewise, a degree of inverse quantization that should be applied.

Inverse Transform

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g., by parsing and/or decoding, e.g., by entropy decoding unit 304) to determine the transform to be applied to the dequantized coefficients 311.

Reconstruction

The reconstruction unit 314 (e.g., adder or summer 314) may be configured to add the reconstructed residual block 313, to the prediction block 365 to obtain a reconstructed block 315 in the sample domain, e.g., by adding the sample values of the reconstructed residual block 313 and the sample values of the prediction block 365.

Filtering

The loop filter unit 320 (either in the coding loop or after the coding loop) is configured to filter the reconstructed block 315 to obtain a filtered block 321, e.g., to smooth pixel transitions, or otherwise improve the video quality. The loop filter unit 320 may comprise one or more loop filters such as a de-blocking filter, a sample-adaptive offset (SAO) filter or one or more other filters, e.g., a bilateral filter, an adaptive loop filter (ALF), a sharpening, a smoothing filters or a collaborative filters, or any combination thereof. Although the loop filter unit 320 is shown in FIG. 3 as being an in loop filter, in other configurations, the loop filter unit 320 may be implemented as a post loop filter.

Decoded Picture Buffer

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g., via output 312, for presentation or viewing to a user.

Prediction

The inter prediction unit 344 may be identical to the inter prediction unit 244 (in particular to the motion compensation unit) and the intra prediction unit 354 may be identical to the inter prediction unit 254 in function, and performs split or partitioning decisions and prediction based on the partitioning and/or prediction parameters or respective information received from the encoded picture data 21 (e.g., by parsing and/or decoding, e.g., by entropy decoding unit 304). Mode selection unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode selection unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g., motion compensation unit) of mode selection unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Mode selection unit 360 is configured to determine the prediction information for a video block of the current video slice by parsing the motion vectors and other syntax elements, and uses the prediction information to produce the prediction blocks for the current video block being decoded. For example, the mode selection unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

It should be noted that further operations may be applied to the derived motion vectors of current block (including but not limit to control point motion vectors of affine mode, sub-block motion vectors in affine, planar, ATMVP modes, temporal motion vectors, and so on). For example, the value of motion vector is constrained to a predefined range according to its representing bit. If the representing bit of motion vector is bitDepth, then the range is $-2^{\wedge}(\text{bitDepth}-1) \sim 2^{\wedge}(\text{bitDepth}-1)-1$, where "^" means exponentiation. For example, if bitDepth is set equal to 16, the range is $-32768 \sim 32767$; if bitDepth is set equal to 18, the range is $-131072 \sim 131071$. For example, the value of the derived motion vector (e.g., the MVs of four 4×4 sub-blocks within one 8×8 block) is constrained such that the max difference between integer parts of the four 4×4 sub-block MVs is no more than N pixels, such as no more than 1 pixel. Here provides two methods for constraining the motion vector according to the bitDepth.

Method 1: Remove the Overflow MSB (Most Significant Bit) by Flowing Operations $$ux = \left(mvx + 2^{bitDepth}\right) \% \ 2^{bitDepth} \qquad (1)$$

$$mvx = \left(ux >= 2^{bitDepth-1}\right)?\left(ux - 2^{bitDepth}\right): ux \qquad (2)$$

$$uy = \left(mvy + 2^{bitDepth}\right) \% \ 2^{bitDepth} \qquad (3)$$

$$mvy = \left(uy >= 2^{bitDepth-1}\right)?\left(uy - 2^{bitDepth}\right): uy \qquad (4)$$

where mvx is a horizontal component of a motion vector of an image block or a sub-block, mvy is a vertical component of a motion vector of an image block or a sub-block, and ux and uy indicates an intermediate value.

For example, if the value of mvx is −32769, after applying formula (1) and (2), the resulting value is 32767. In computer system, decimal numbers are stored as two's complement. The two's complement of −32769 is 1,0111,1111, 1111,1111 (17 bits), then the MSB is discarded, so the resulting two's complement is 0111,1111,1111,1111 (decimal number is 32767), which is same as the output by applying formula (1) and (2).

$$ux = \left(mvpx + mvdx + 2^{bitDepth}\right) \% \ 2^{bitDepth} \qquad (5)$$

$$mvx = \left(ux >= 2^{bitDepth-1}\right)?\left(ux - 2^{bitDepth}\right): ux \qquad (6)$$

$$uy = \left(mvpy + mvdy + 2^{bitDepth}\right) \% \ 2^{bitDepth} \qquad (7)$$

$$mvy = \left(uy >= 2^{bitDepth-1}\right)?\left(uy - 2^{bitDepth}\right): uy \qquad (8)$$

The operations may be applied during the sum of mvp and mvd, as shown in formula (5) to (8).

Method 2: Remove the Overflow MSB by Clipping the Value $$vx = \text{Clip3}\left(-2^{bitDepth-1}, 2^{bitDepth-1} - 1, vx\right)$$

$$vy = \text{Clip3}\left(-2^{bitDepth-1}, 2^{bitDepth-1} - 1, vy\right)$$

where vx is a horizontal component of a motion vector of an image block or a sub-block, vy is a vertical component of a motion vector of an image block or a sub-block; x, y and z respectively correspond to three input value of the MV clipping process, and the definition of function Clip3 is as follow:

$$\text{Clip3}(x, y, z) = \begin{cases} x; & z < x \\ y; & z > y \\ z; & \text{otherwise} \end{cases}$$

Figure 4:
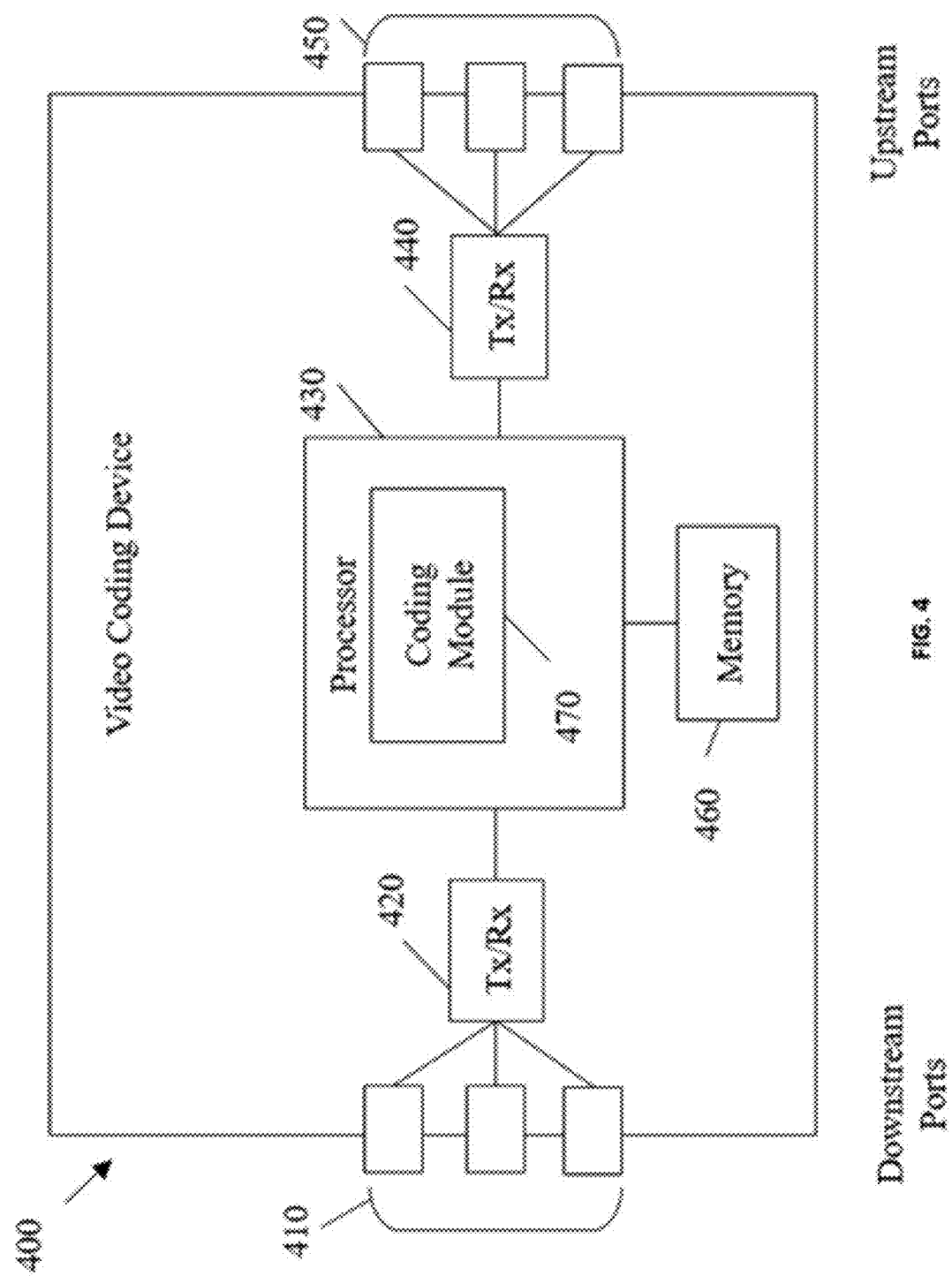
FIG. 4 is a block diagram illustrating an example of an encoding apparatus or a decoding apparatus.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 5:
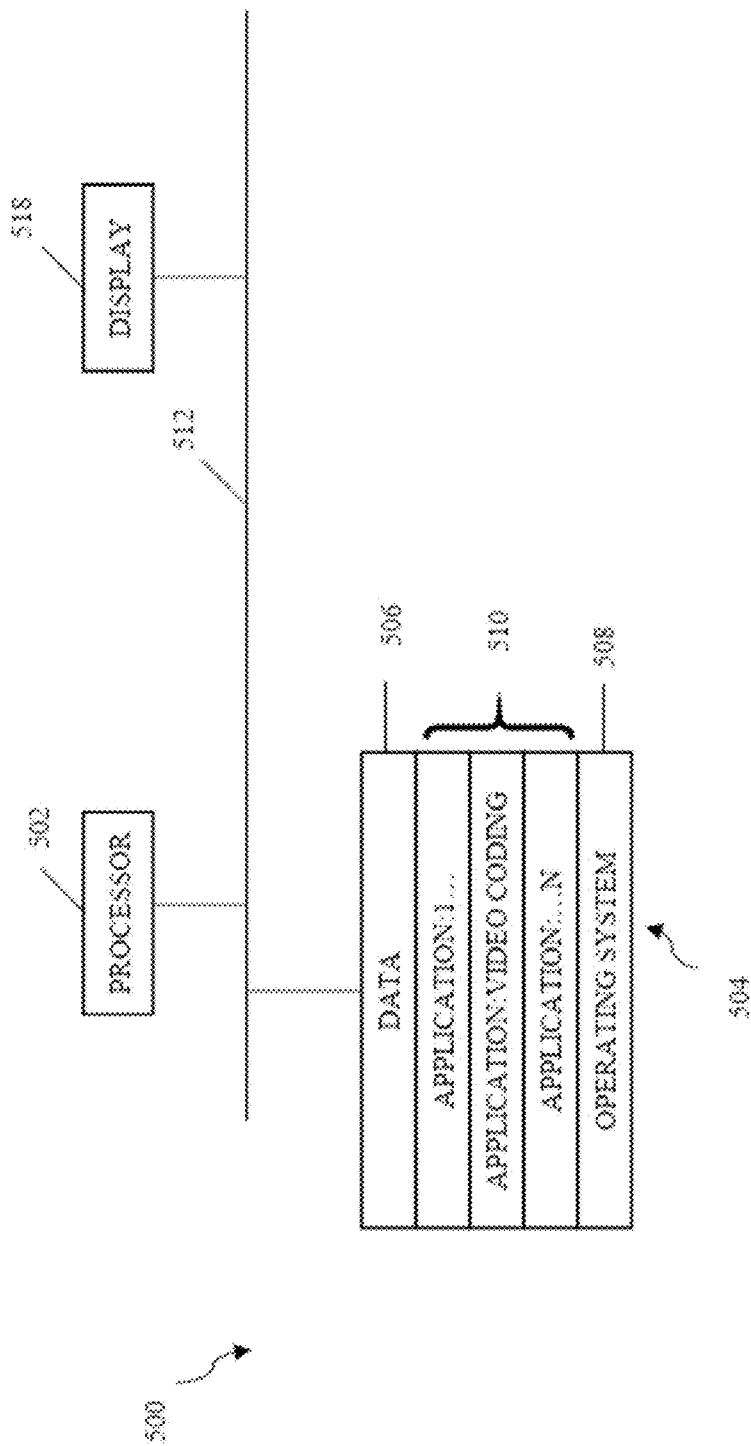
FIG. 5 is a block diagram illustrating another example of an encoding apparatus or a decoding apparatus.

FIG. 5 is a simplified block diagram of an apparatus 500 that may be used as either or both of the source device 12 and the destination device 14 from FIG. 1 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In-Loop Filter Background

There are totally three in loop filters in VTM3 (VVC Test Model 3). Besides deblocking filter and SAO (the two loop filters in HEVC), adaptive loop filter (ALF) are applied in the VTM3. The order of the filtering process in the VTM3 is the deblocking filter, SAO and ALF.

ALF Background

In the VTM3, an adaptive loop filter (ALF) with block-based filter adaption is applied. For the luma component, one among 25 filters is selected for each 4×4 block, based on the direction and activity of local gradients.

Filter Shape:

In the JEM, two diamond filter shapes (as shown in FIG. 6) are used for the luma component. The 7×7 diamond shape is applied for luma component and the 5×5 diamond shape applied for chroma component.

Block Classification:

For luma component, each 4×4 block is categorized into one out of 25 classes. The classification index C is derived based on its directionality D and a quantized value of activity Â, as follows:

$$C = 5D + \hat{A} \quad (9)$$

To calculate D and Â, gradients of the horizontal, vertical and two diagonal direction are first calculated using 1-D Laplacian:

$$g_v = \sum\nolimits_{k=i-2}^{i+3} \sum\nolimits_{l=j-2}^{j+3} V_{k,l}, V_{k,l} = |2R(k,l) - R(k,l-1) - R(k,l+1)| \quad (10)$$

$$g_h = \sum\nolimits_{k=i-2}^{i+3} \sum\nolimits_{l=j-2}^{j+3} H_{k,l}, H_{k,l} = |2R(k,l) - R(k-1,l) - R(k+1,l)| \quad (11)$$

$$g_{d1} = \sum\nolimits_{k=i-2}^{i+3} \sum\nolimits_{l=j-2}^{j+3} D1_{k,l}, \quad (12)$$

$$D1_{k,l} = |2R(k,l) - R(k-1,l-1) - R(k+1,l+1)|$$

$$g_{d2} = \sum\nolimits_{k=i-2}^{i+3} \sum\nolimits_{j=j-2}^{j+3} D2_{k,l}, \quad (13)$$

$$D2_{k,l} = |2R(k,l) - R(k-1,l+1) - R(k+1,l-1)|$$

Where indices i and j refer to the coordinates of the upper left sample within the 4×4 block and R(i,j) indicates a reconstructed sample at coordinate (i,j).

To reduce the complexity of block classification, the subsampled 1-D Laplacian calculation is applied. As shown in FIG. 7, the same subsampled positions are used for gradient calculation of all directions.

Then D maximum and minimum values of the gradients of horizontal and vertical directions are set as:

$$g_{h,v}^{max} = \max(g_h, g_v), \quad (14)$$

$$g_{h,v}^{min} = \min(g_h, g_v)$$

The maximum and minimum values of the gradient of two diagonal directions are set as:

$$g_{d0,d1}^{max} = \max(g_{d0}, g_{d1}), \quad (15)$$

$$g_{d0,d1}^{min} = \min(g_{d0}, g_{d1})$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{h,l}) \qquad (16)$$

A is further quantized to the range of 0 to 4, inclusively, and the quantized value is denoted as Â.

For chroma components in a picture, no classification method is applied, i.e. a single set of ALF coefficients is applied for each chroma component.

Geometric Transformations of Filter Coefficients

Before filtering each 4×4 luma block, geometric transformations such as rotation or diagonal and vertical flipping are applied to the filter coefficients f(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

$$\text{Diagonal: } f_D(k, l) = f(l, k) \qquad (17)$$

$$\text{Vertical flip: } f_V(k, l) = f(k, K - l - 1) \qquad (18)$$

$$\text{Rotation: } f_R(k, l) = f(K - l - 1, k) \qquad (19)$$

where K is the size of the filter and $0 \leq k$, $l \leq K-1$ are coefficients coordinates, such that location (0,0) is at the upper left corner and location (K-1, K-1) is at the lower right corner. The transformations are applied to the filter coefficients f (k, l) depending on gradient values calculated for that block. The relationship between the transformation and the four gradients of the four directions are summarized in the following table.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter Parameters Signalling

In the VTM3, ALF filter parameters are signalled in the slice header. Up to 25 sets of luma filter coefficients could be signalled. To reduce bits overhead, filter coefficients of different classification can be merged.

The filtering process can be controlled at CTB level. A flag is always signalled to indicate whether ALF is applied to a luma CTB. For each chroma CTB, a flag might be signalled to indicate whether ALF is applied to a chroma CTB depends on the value of alf_chroma_ctb_present_flag.

The filter coefficients are quantized with norm equal to 128. To further restrict the multiplication complexity, a bitstream conformance is applied that the coefficient value of the central position shall be in the range of 0 to $2^8$ and he coefficient values of the remaining positions shall be in the range of $-2^7$ to $2^7-1$, inclusive.

Filtering Process

At decoder side, when ALF is enabled for a CTB, each sample R(i,j) within the CU is filtered, resulting in sample value R'(i, j) as shown below, where L denotes filter length, $f_{m,n}$ represents filter coefficient, and f(k, l) denotes the decoded filter coefficients.

$$R'(i, j) = \left( \sum_{k=-\frac{L}{2}}^{\frac{L}{2}} \sum_{l=-\frac{L}{2}}^{\frac{L}{2}} f(k, l) \times R(i + k, j + l) + 64 \right) >> 7 \qquad (20)$$

ALF Syntax Specification According to the VVC Specification

Adaptive Loop Filter Process 1.1 General

Inputs of this process are the reconstructed picture sample arrays prior to adaptive loop filter recPictureL, recPictureCb and recPictureCr.

Outputs of this process are the modified reconstructed picture sample arrays after adaptive loop filter alfPictureL, alfPictureCb and alfPictureCr.

The sample values in the modified reconstructed picture sample arrays after adaptive loop filter alfPictureL, alfPictureCb and alfPictureCr, are initially set equal to the sample values in the reconstructed picture sample arrays prior to adaptive loop filter recPictureL, recPictureCb and recPictureCr, respectively.

When a value of tile_group_alf_enabled_flag is equal to 1, for every coding tree unit with luma coding tree block location (rx, ry), where rx=0 . . . PicWidthInCtbs−1 and ry=0 . . . PicHeightInCtbs−1, the following process are applied:

When a value of alf_ctb_flag[0][rx][ry] is equal to 1, the coding tree block filtering process for luma samples as specified in clause 1.2 is invoked with recPictureL, alfPictureL, and the luma coding tree block location (xCtb, yCtb) set equal to (rx<<CtbLog2SizeY, ry<<CtbLog2SizeY) as inputs, and the output is the modified filtered picture alfPictureL.

When a value of alf_ctb_flag[1][rx][ry] is equal to 1, the coding tree block filtering process for chroma samples as specified in clause 1.1 is invoked with recPicture set equal to recPictureCb, alfPicture set equal to alfPictureCb, and the chroma coding tree block location (xCtbC, yCtbC) set equal to (rx<<(CtbLog2SizeY−1), ry<<(CtbLog2SizeY−1)) as inputs, and the output is the modified filtered picture alfPictureCb.

When a value of alf_ctb_flag[2][rx][ry] is equal to 1, the coding tree block filtering process for chroma samples as specified in clause 1.4 is invoked with recPicture set equal to recPictureCr, alfPicture set equal to alfPictureCr, and the chroma coding tree block location (xCtbC, yCtbC) set equal to (rx<<(CtbLog2SizeY−1), ry<<(CtbLog2SizeY−1)) as inputs, and the output is the modified filtered picture alfPictureCr.

1.2 Coding Tree Block Filtering Process for Luma Samples

Inputs of this Process are:

a reconstructed luma picture sample array recPictureL prior to the adaptive loop filtering process, a filtered reconstructed luma picture sample array alfPictureL, a luma location (xCtb, yCtb) specifying the top-left sample of the current luma coding tree block relative to the top left sample of the current picture.

Output of this process is the modified filtered reconstructed luma picture sample array alfPictureL. The derivation process for filter index clause 1.3 is invoked with the location (xCtb, yCtb) and the reconstructed luma picture sample array recPictureL as inputs, and filtIdx[x][y] and transposeIdx[x][y] with x, y=0 . . . CtbSizeY−1 as outputs.

For the derivation of the filtered reconstructed luma samples alfPictureL[x][y], each reconstructed luma sample inside the current luma coding tree block recPictureL[x][y] is filtered as follows with x, y=0 . . . CtbSizeY−1:

The array of luma filter coefficients f[j] corresponding to the filter specified by filtIdx[x][y] is derived as follows with j=0 . . . 12:

$$f[j] = AlfCoeffL[filtIdx[x][y]][j].$$

The luma filter coefficients filterCoeff are derived depending on transposeIdx[x][y] as follows:

If transposeIndex[x][y]==1,
filterCoeff[ ]={f[9], f[4], f[10], f[8], f[1], f[5], f[11], f[7], f[3], f[0], f[2], f[6], f[12]}

Otherwise, if transposeIndex[x][y]==2,
filterCoeff[ ]={f[0], f[3], f[2], f[1], f[8], f[7], f[6], f[5], f[4], f[9], f[10], f[11], f[12]}

Otherwise, if transposeIndex[x][y]==3,
filterCoeff[ ]={f[9], f[8], f[10], f[4], f[3], f[7], f[11], f[5], f[1], f[0], f[2], f[6], f[12]}

Otherwise,
filterCoeff[ ]={f[0], f[1], f[2], f[3], f[4], f[5], f[6], f[7], f[8], f[9], f[10], f[11], f[12]}

The locations (hx, vy) for each of the corresponding luma samples (x, y) inside the given array recPicture of luma samples are derived as follows:

$$hx = \text{Clip3}(0, \text{pic\_width\_in\_luma\_samples} - 1, xCtb + x)$$
$$vy = \text{Clip3}(0, \text{pic\_height\_in\_luma\_samples} - 1, yCtb + y)$$

The variable sum is derived as follows:

$$\begin{aligned}sum = {}& filterCoeff[0] * (recPictureL[hx, vy + 3] + \\ & recPictureL[hx, vy - 3]) + \\ & filterCoeff[1] * (recPictureL[hx, vy + 3] + \\ & recPictureL[hx - 1, vy - 2]) + \\ & filterCoeff[2] * (recPictureL[hx, vy + 2] + \\ & recPictureL[hx, vy - 2]) + \\ & filterCoeff[3] * (recPictureL[hx - 1, vy + 2] + \\ & recPictureL[hx + 1, vy - 2]) + \\ & filterCoeff[4] * (recPictureL[hx + 2, vy + 1] + \\ & recPictureL[hx - 2, vy - 1]) + \\ & filterCoeff[5] * (recPictureL[hx + 1, vy + 1] + \\ & recPictureL[hx - 1, vy - 1]) + \\ & filterCoeff[6] * (recPictureL[hx, vy + 1] + \\ & recPictureL[hx, vy - 1]) + \\ & filterCoeff[7] * (recPictureL[hx - 1, vy + 1] + \\ & recPictureL[hx + 1, vy - 1]) + \\ & filterCoeff[8] * (recPictureL[hx - 2, vy + 1] + \\ & recPictureL[hx + 2, vy - 1]) + \\ & filterCoeff[9] * (recPictureL[hx + 3, vy] + \\ & recPictureL[hx - 3, vy]) + \\ & filterCoeff[10] * (recPictureL[hx + 2, vy] + \\ & recPictureL[hx - 2, vy]) + \\ & filterCoeff[11] * (recPictureL[hx + 1, vy] + \\ & recPictureL[hx - 1, vy]) + \\ & filterCoeff[12] * (recPictureL[hx, vy])\end{aligned}$$

$$sum = (sum + 64) >> 7$$

The modified filtered reconstructed luma picture sample alfPictureL[xCtb+x][yCtb+y] is derived as follows:

$$alfPictureL[xCtb + x][yCtb + y] = \text{Clip3}(0, (1 << \text{BitDepth}Y) - 1, sum).$$

1.3 Derivation Process for ALF Transpose and Filter Index for Luma Samples

Inputs of this Process are:

a luma location (xCtb, yCtb) specifying the top-left sample of the current luma coding tree block relative to the top left sample of the current picture, a reconstructed luma picture sample array recPictureL prior to the adaptive loop filtering process.

Outputs of this process are the classification filter index array filtIdx[x][y] with x, y=0 . . . CtbSizeY−1, the transpose index array transposeIdx[x][y] with x, y=0 . . . CtbSizeY−1.

The locations (hx, vy) for each of the corresponding luma samples (x, y) inside the given array recPicture of luma samples are derived as follows:

$$hx = \text{Clip3}(0, \text{pic\_width\_in\_luma\_samples} - 1, x)$$
$$vy = \text{Clip3}(0, \text{pic\_height\_in\_luma\_samples} - 1, y)$$

The classification filter index array filtIdx and the transpose index array transposeIdx are derived by the following ordered steps:

The variables filtH[x][y], filtV[x][y], filtD0[x][y] and filtD1[x][y] with x, y=−2 . . . CtbSizeY+1 are derived as follows:

If both x and y are even numbers or both x and y are uneven numbers, the following applies:

$$filtH[x][y] =$$
$$\text{Abs}((recPicture[hxCtb + x, vyCtb + y] << 1) - recPicture[hxCtb + x - 1,$$
$$vyCtb + y] - recPicture[hxCtb + x + 1, vyCtb + y])$$

$$filtV[x][y] =$$
$$\text{Abs}((recPicture[hxCtb + x, vyCtb + y] << 1) - recPicture[hxCtb + x,$$
$$vyCtb + y - 1] - recPicture[hxCtb + x, vyCtb + y + 1])$$

$$filtD0[x][y] =$$
$$\text{Abs}((recPicture[hxCtb + x, vyCtb + y] << 1) - recPicture[hxCtb + x - 1,$$
$$vyCtb + y - 1] - recPicture[xCtb + x + 1, vyCtb + y + 1])$$

$$filtD1[x][y] =$$
$$\text{Abs}((recPicture[hxCtb + x, vyCtb + y] << 1) - recPicture[hxCtb + x + 1,$$
$$vyCtb + y - 1] - recPicture[hxCtb + x - 1, vyCtb + y + 1])$$

Otherwise, filtH[x][y], filtV[x][y], filtD0[x][y] and filtD1[x][y] are set equal to 0. The variables varTempH1[x][y], varTempV1[x][y], varTempD01[x][y], varTempD11[x][y] and varTemp[x][y] with x, y=0 . . . (CtbSizeY−1)>>2 are derived as follows:

$$sumH[x][y] = \sum_i \sum_j filtH[(x \ll 2) + i][(y \ll 2) + j]$$
$$\text{with}$$
$$i, j = -2 \ldots 5$$

$$sumV[x][y] = \sum_i \sum_j filtV[(x \ll 2) + i][(y \ll 2) + j]$$
$$\text{with}$$
$$i, j = -2 \ldots 5$$

$$sumD0[x][y] = \sum_i \sum_j filtD0[(x \ll 2) + i][(y \ll 2) + j]$$
$$\text{with}$$
$$i, j = -2 \ldots 5$$

$$sumD1[x][y] = \sum_i \sum_j filtD1[(x \ll 2) + i][(y \ll 2) + j]$$
$$\text{with}$$
$$i, j = -2 \ldots 5$$

$$sumOfHV[x][y] = sumH[x][y] + sumV[x][y]$$

The variables dir1[x][y], dir2[x][y] and dirS[x][y] with x, y=0 . . . CtbSizeY−1 are derived as follows:
The variables hv1, hv0 and dirHV are derived as follows:
If sumV[x>>2][y>>2] is greater than sumH[x>>2][y>>2], the following applies:

$$hv1 = sumV[x \gg 2][y \gg 2]$$
$$hv0 = sumH[x \gg 2][y \gg 2]$$
$$dirHV = 1$$

Otherwise, the following applies:

$$hv1 = sumH[x \gg 2][y \gg 2]$$
$$hv0 = sumV[x \gg 2][y \gg 2]$$
$$dirHV = 3$$

The variables d1, d0 and dirD are derived as follows:
If sumD0[x>>2][y>>2] is greater than sumD1[x>>2][y>>2], the following applies:

$$d1 = sumD0[x \gg 2][y \gg 2]$$
$$d0 = sumD1[x \gg 2][y \gg 2]$$
$$dirD = 0$$

Otherwise, the following applies:

$$d1 = sumD1[x \gg 2][y \gg 2]$$
$$d0 = sumD0[x \gg 2][y \gg 2]$$
$$dirD = 2$$

The variables hvd1, hvd0, are derived as follows:

$$hvd1 = (d1 * hv0 > hv1 * d0) ? d1 : hv1$$
$$hvd0 = (d1 * hv0 > hv1 * d0) ? d0 : hv0$$

The variables dirS[x][y], dir1[x][y] and dir2[x][y] derived as follows:

$$dir1[x][y] = (d1 * hv0 > hv1 * d0) ? dirD : dirHV$$
$$dir2[x][y] = (d1 * hv0 > hv1 * d0) ? dirHV : dirD$$
$$dirS[x][y] = (hvd1 > 2 * hvd0) ? 1 : ((hvd1 * 2 > 9 * hvd0) ? 2 : 0)$$

The variable avgVar[x][y] with x, y=0 . . . CtbSizeY−1 is derived as follows:
varTab[ ]={0, 1, 2, 2, 2, 2, 2, 3, 3, 3, 3, 3, 3, 3, 3, 4}

$$avgVar[x][y] =$$
$$varTab[Clip3(0, 15, (sumOfHV[x \gg 2][y \gg 2] * 64) \gg (3 + BitDepthY))]$$

The classification filter index array filtIdx[x][y] and the transpose index array transposeIdx[x][y] with x=y=0 . . . CtbSizeY−1 are derived as follows:
transposeTable[ ]={0, 1, 0, 2, 2, 3, 1, 3}

$$transposeIdx[x][y] =$$
$$transposeTable[dir1[x][y] * 2 + (dir2[x][y] \gg 1)] filtIdx[x][y] =$$
$$avgVar[x][y]$$

When dirS[x][y] is not equal 0, filtIdx[x][y] is modified as follows:

$$filtIdx[x][y] \mathrel{+}= (((dir1[x][y] \mathbin{\&} 0 \times 1) \ll 1) + dirS[x][y]) * 5.$$

1.4 Coding Tree Block Filtering Process for Chroma Samples

Inputs of this Process are:
- a reconstructed chroma picture sample array recPicture prior to the adaptive loop filtering process,
- a filtered reconstructed chroma picture sample array alfPicture,
- a chroma location (xCtbC, yCtbC) specifying the top-left sample of the current chroma coding tree block relative to the top left sample of the current picture.

Output of this process is the modified filtered reconstructed chroma picture sample array alfPicture The size of the current chroma coding tree block ctbSizeC is derived as follows:

$$ctbSizeC = CtbSizeY / SubWidthC$$

For the derivation of the filtered reconstructed chroma samples alfPicture[x][y], each reconstructed chroma sample inside the current chroma coding tree block recPicture[x][y] is filtered as follows with x, y=0 ... ctbSizeC−1:

The locations (hx, vy) for each of the corresponding chroma samples (x, y) inside the given array recPicture of chroma samples are derived as follows:

$$hx = Clip3(0, pic\_width\_in\_luma\_samples / SubWidthC − 1, xCtbC + x)$$

$$vy = Clip3(0, pic\_height\_in\_luma\_samples / SubHeightC − 1, xCtbC + y)$$

The variable sum is derived as follows:

$$sum = AlfCoeffC[0] * (recPicture[hx, vy + 2] + recPicture[hx, vy − 2]) +$$

$$AlfCoeffC[1] * (recPicture[hx + 1, vy + 1] + recPicture[hx − 1, vy − 1]) +$$

$$AlfCoeffC[2] * (recPicture[hx, vy + 1] + recPicture[hx, vy − 1]) +$$

$$AlfCoeffC[3] * (recPicture[hx − 1, vy + 1] + recPicture[hx + 1, vy − 1]) +$$

$$AlfCoeffC[4] * (recPicture[hx + 2, vy] + recPicture[hx − 2, vy]) +$$

$$AlfCoeffC[5] * (recPicture[hx + 1, vy] + recPicture[hx − 1, vy]) +$$

$$AlfCoeffC[6] * recPicture[hx, vy]$$

$$sum = (sum + 64) \gg 7$$

The modified filtered reconstructed chroma picture sample alfPicture[xCtbC+x][yCtbC+y] is derived as follows:

$$alfPicture[xCtbC + x][yCtbC + y] = Clip3(0, (1 \ll BitDepthC) − 1, sum).$$

The current line buffer requirement of three cascaded loop filters (Deblocking, SAO, ALF) of VTM-3.0 for Luma component is derived to be 11.25 lines and for the Chroma component it is derived to be 6.25 lines (see FIG. 8). Accommodating increased line buffer requirements on hardware chips is known to be a concern as the line buffer needs to be stored on the "on-chip" memory, thereby increasing the hardware chip area. Therefore the current invention addresses the problem of reducing the line buffer requirements for the VTM-3.0 in loop filter stage. This particular invention mainly addresses the line buffer reduction of "ALF block classification" and "ALF filtering" method.

To reduce line buffer requirements of VTM-3.0,

ALF block classification is adapted to make sure that the ALF block classification does not need any pixels above or below the virtual boundary (VB). Virtual boundaries (VBs) are upward shifted horizontal CTU boundaries by "N" pixels. For each CTU, SAO and ALF can process samples above the VB before the lower CTU comes but cannot process samples below the VB until the lower CTU comes, which is mainly caused because of the delay in vertical deblocking filtering.

In VTM-3.0, N can take a positive integer value which is greater than or equal to 4. Specifically the current invention provides more details when N=4 and when N=6, To reduce line buffer requirements, this invention mainly adapts the ALF block classification is such a way that the subset of samples which are originally used in the block classification are further used.

The invention further uses a "grid shifting" approach for cases when the ALF block classification window size (P×P) is not an integer multiple of N. In current VTM-3.0 ALF block classification is performed for 4×4 blocks. Therefore P is set to 4 for VTM-3.0. Grid shifting approach mainly shifts the ALF block classification window by a integer number of samples, so that a given P×P block classification window would never cross the virtual boundary. Therefore for the initial samples in the picture which is equivalent to "P–N", the ALF block classification is done by only using 2×2 block window or the first "P–N" lines re-use the block classification decision of the 4×4 block starting immediately at ("P–N"+1)

ALF Filtering is adapted to use distorted versions of the filter for both Luma and Chroma components by either using padding or by adding the un-used filter coefficients to the central coefficient. In such a way additional line buffers are not required for ALF filtering Core of the invention is to use a modified version of the original ALF block classification such that the block classification will not require any additional line buffers. Also the ALF filtering is modified in such a way that it does not need any additional buffers. The modified version of block classification only uses a subset of samples which are originally used in the original block classification.

As shown in FIG. 8, the Luma line buffer requirements for VVC is 11.25 Luma lines, when the virtual boundary is considered to 4 lines above the CTU boundary.

The explanation of the line buffer requirement is as follows: The deblocking of horizontal edge overlapping with CTU edge cannot be performed as the decisions and filtering require lines K, L, M, M from the first CTU and Lines O, P . . . from the bottom CTU. Therefore the deblocking of the horizontal edges overlapping with the CTU boundary is postponed until the lower CTU comes. Therefore the lines K, L, M, N which are the reconstructed luma samples have to be stored on the line buffer (4 lines). Then the SAO filtering can be performed for lines A till J. The line J can be SAO filtered as deblocking does not change the samples in line K. For SAO filtering of line K, the edge offset classification decision is only stored in the line buffer (which is 0.25 Luma lines). The ALF filtering can only be performed for lines A-F. As shown in FIG. 1, the ALF classification is performed for each 4×4 block. Each 4×4 block classification needs an activity window of size 8×8 which in turn needs a 9×9 window to compute the 1d Laplacian to determine the gradient.

Therefore for the block classification of lines G, H, I, J needs SAO filtered samples below the Virtual boundary. Also the lines D, E, F SAO filtered samples are required for sample classification. Also ALF filtering of Line G needs three SAO filtered lines D, E, F from Above. Therefore the total line buffer requirement is as follows:

Lines K-N(Horizontal DF pixels): 4
Lines D-J (SAO filtered pixels): 7
SAO Edge offset classifier values between line J and line K: 0.25
Therefore the total number of Luma lines is 7+4+0.25=11.25

Modified block classification when a virtual boundary is 4 lines above the CTU boundary FIG. 9A and FIG. 9B depicts how the ALF block classification is performed for the lines above and below the virtual boundary.

Solution 1 (Asymmetric Truncated ALF Block Classification)

As shown in FIG. 9A and FIG. 18A, for the 4×4 block immediately above the virtual boundary, only samples which are above the block boundary are used for block classification.

As shown in FIG. 9B, for the block classification of 4×4 block immediately below virtual boundary, only the samples which are below the virtual boundary are used.

Figure 22A:
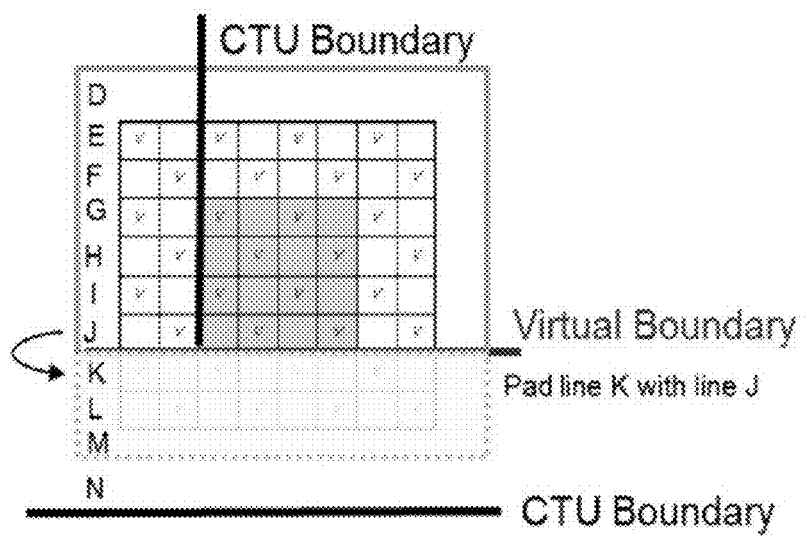

In FIG. 9A, FIG. 22A (case when 4×4 block is above VB), the block classification for the 4×4 block beginning at line G, uses lines D, E, F, F, H, J, J. Since gradient calculation of samples belonging to line J line need one more line below, therefore line J is padded to line K. Moreover the activity calculation which is used is modified as follows: avgVar[x][y]=varTab[Clip3(0, 15, (sumOfHV[x>>2][y>>2]*Ac)>>(3+BitDepth$_Y$))] where Ac value is 96 for the 4×4 blocks near the virtual boundary and 64 for the other blocks. Alternatively, for the block classification of block beginning at line G, only the lines D, E, F, G are used. Line I could be further used for the classification but the current implementation of ALF block classification in VTM 3.0 calculates gradients for every set of 2 lines which makes it cumbersome to include line I in the classification.

The second solution is to use simple padding. The line J is padded to line K, L, M and then the lines beginning from D till M can be used for the block classification.

Figure 22B:
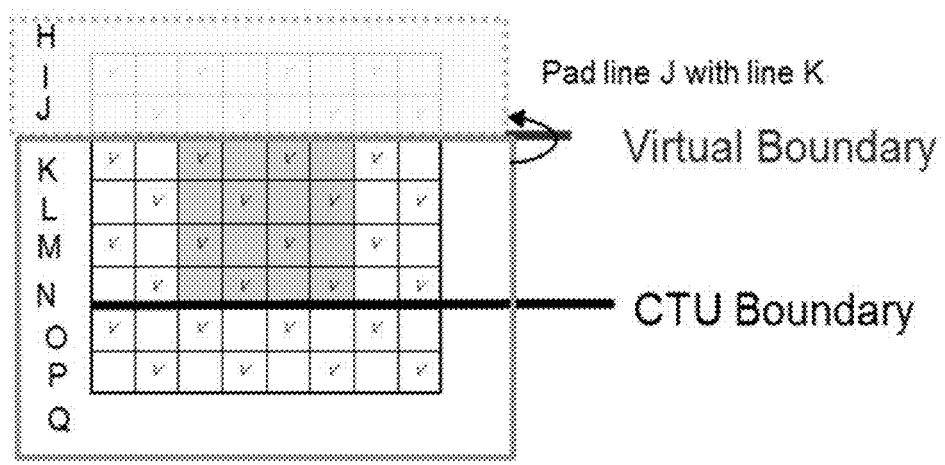

In FIG. 9B, FIG. 18B and FIG. 22B, (case when 4×4 block is below VB), the block classification for the block beginning at line K uses lines K, L, M, N, O, P, Q. Since gradient calculation of samples belonging to line K line need one more line above, therefore line K is padded to line J. Moreover the activity calculation which is used is modified as follows: avgVar[x][y]=varTab[Clip3(0, 15, (sumOfHV[x>>2][y>>2]*Ac)>>(3+BitDepth$_Y$))] where Ac value is 96 for the blocks near the virtual boundary and 64 for the other blocks. Alternatively, for the block classification of block beginning at line K, only the lines M, N, O, P, Q are used. Line L could be further used for the classification however the current implementation of ALF block classification in VTM 3.0 calculates gradients for every set of 2 lines which makes it cumbersome to include line L in the classification.

The second solution is to use simple padding. The line K is padded to line J, I, H and then the lines beginning from H till Q can be used for the block classification Solution 2 (Symmetric truncated ALF Block Classification)

As shown in FIG. 10 the symmetric truncated ALF block classification only uses the inner 4 samples (a, b, c, d) to classify the given block. In FIG. 10a, for the block starting at line G, only the samples belonging to lines G and I (samples a, b, c, d) are used in the gradient computations. No additional padding is required in this case. Similarly in FIG. 10b, for the block starting at line K, only the samples belonging to lines L and M (samples a, b, c, d) are used in the gradient computations. No additional padding is also required in this case. This solution has the advantage that the gradient is computed using a symmetric block shape which may be advantageous for subjective picture quality especially when the picture content changes frequently inside a given local window. Also the solution is computationally less complex as it computes gradient using only 4 samples (a, b, c, d).

FIG. 11 depicts a special case when ALF block classification could use two extra lines of line buffer which can store SAO filtered samples. In this case, the ALF block classification could use two additional lines both above and below the virtual boundary for the blocks starting at line G and line K respectively.

Modified ALF Filtering when Virtual Boundary is 4 Lines

FIG. 12 depicts modified ALF filtering to avoid ALF luma line buffers. For filtering of lines H, J, I (above virtual boundary) and lines K, L, M (below virtual boundary), distorted versions of the 7×7 luma filter are used.

Two solutions are proposed. The filter discards the coefficients which are above and below the virtual boundary in a symmetric fashion. For e.g., for the filtering of line M, the coefficient c0 lies above the virtual boundary and vice versa for line H filtering. Therefore in this case for solution 1, the discarded coefficient c0 is added to the neighboring coefficient which is immediately vertical. Therefore 2'=c2+c0. In solution 2, the discarded coefficient is added to the central coefficient, resulting in c12'=c12+2*c0

Similarly for Line L and Line I filtering the modified coefficient values are for solution 1:

$$c5' = c5 + c1$$

$$c6' = c6 + c2 + c0$$

$$c7' = c7 + c3$$

For solution 2: c12'=c12+2*c0+2*c1+2*c2+2*c3

Similarly for Line J and Line K filtering the modified coefficient values are for solution 1:

$$c10' = c10 + c4 + c8$$

$$c11' = c11 + c5 + c7 + c1 + c3$$

$$c12' = c12 + 2*c6 + 2*c2 + 2*c0$$

This solution can also be treated as symmetric padding as shown in FIG. 21. As shown in FIG. 21A, for filtering of line M, line K is padded to line J, and line J is padded to line K.

As shown in FIG. 21B, for filtering of line L, line K is padded to line J and line I. Similarly for filtering of line I, line J is padded to line K and line L.

As shown in FIG. 21C, for filtering of line K, line K is padded to lines J, I and H. Similarly for filtering of line J, line J is padded to lines K, L, and M.

Similar process as described above is also performed for chroma ALF filtering.

The syntax specification changes for the solution1 is given below:

2.1 General

Inputs of this process are the reconstructed picture sample arrays prior to adaptive loop filter recPictureL, recPictureCb and recPictureCr.

Outputs of this process are the modified reconstructed picture sample arrays after adaptive loop filter alfPictureL, alfPictureCb and alfPictureCr.

The sample values in the modified reconstructed picture sample arrays after adaptive loop filter alfPictureL, alfPictureCb and alfPictureCr, are initially set equal to the sample values in the reconstructed picture sample arrays prior to adaptive loop filter recPictureL, recPictureCb and recPictureCr, respectively.

When a value of tile_group_alf_enabled_flag is equal to 1, for every coding tree unit with luma coding tree block location (rx, ry), where rx=0 . . . PicWidthInCtbs−1 and ry=0 . . . PicHeightInCtbs−1, the following applies:

When a value of alf_ctb_flag[0][rx][ry] is equal to 1, the coding tree block filtering process for luma samples as specified in clause 2.2 is invoked with recPictureL, alfPictureL, and the luma coding tree block location (xCtb, yCtb) set equal to (rx<<CtbLog2SizeY, ry<<CtbLog2SizeY) as inputs, and the output is the modified filtered picture alfPictureL.

When a value of alf_ctb_flag[1][rx][ry] is equal to 1, the coding tree block filtering process for chroma samples as specified in clause 2.4 is invoked with recPicture set equal to recPictureCb, alfPicture set equal to alfPictureCb, and the chroma coding tree block location (xCtbC, yCtbC) set equal to (rx<<(CtbLog2SizeY−1), ry>>(CtbLog2SizeY−1)) as inputs, and the output is the modified filtered picture alfPictureCb.

When a value of alf_ctb_flag[2][rx][ry] is equal to 1, the coding tree block filtering process for chroma samples as specified in clause 2.4 is invoked with recPicture set equal to recPictureCr, alfPicture set equal to alfPictureCr, and the chroma coding tree block location (xCtbC, yCtbC) set equal to (rx<<(CtbLog2SizeY−1), ry<<(CtbLog2SizeY−1)) as inputs, and the output is the modified filtered picture alfPictureCr.

2.2 Coding Tree Block Filtering Process for Luma Samples

Inputs of this Process are:
- a reconstructed luma picture sample array recPictureL prior to the adaptive loop filtering process,
- a filtered reconstructed luma picture sample array alfPictureL,
- a luma location (xCtb, yCtb) specifying the top-left sample of the current luma coding tree block relative to the top left sample of the current picture.

Output of this process is the modified filtered reconstructed luma picture sample array alfPictureL. The derivation process for filter index clause 2.3 is invoked with the location (xCtb, yCtb) and the reconstructed luma picture sample array recPictureL as inputs, and filtIdx[x][y] and transposeIdx[x][y] with x, y=0 . . . CtbSizeY−1 as outputs.

For the derivation of the filtered reconstructed luma samples alfPictureL[x][y], each reconstructed luma sample inside the current luma coding tree block recPictureL[x][y] is filtered as follows with x, y=0 . . . CtbSizeY−1:

The array of luma filter coefficients f[j] corresponding to the filter specified by filtIdx[x][y] is derived as follows with j=0 . . . 12:

$$f[j] = AlfCoeffL[filtIdx[x][y]][j]$$

The luma filter coefficients filterCoeff are derived depending on transposeIdx[x][y] as follows:

If transposeIndex[x][y]==1,
filterCoeff[ ]={f[9], f[4], f[10], f[8], f[1], f[5], f[11], f[7], f[3], f[0], f[2], f[6], f[12]}

Otherwise, if transposeIndex[x][y]==2,
filterCoeff[ ]={f[0], f[3], f[2], f[1], f[8], f[7], f[6], f[5], f[4], f[9], f[10], f[11], f[12]}

Otherwise, if transposeIndex[x][y]==3,
filterCoeff[ ]={f[9], f[8], f[10], f[4], f[3], f[7], f[11], f[5], f[1], f[0], f[2], f[6], f[12]}

Otherwise,
filterCoeff[ ]={f[0], f[1], f[2], f[3], f[4], f[5], f[6], f[7], f[8], f[9], f[10], f[11], f[12]}

The locations (hx, vy) for each of the corresponding luma samples (x, y) inside the given array recPicture of luma samples are derived as follows:

$$hx = \text{Clip3}(0, pic\_width\_in\_luma\_samples - 1, xCtb + x)$$

$$vy = y$$

Filter input sample position offset r=0 . . . 6 are derived according to luma sample position y as shown in the Table 2-2a below TABLE 2-2a Specification of filter input sample position offset r = 0 . . . 6 according to the luma sample position y

| y | r1 | r2 | r3 | r4 | r5 | r6 |
|---|---|---|---|---|---|---|
| y == CtbSizeY − 5 (or) CtbSizeY − 4 | 0 | 0 | 0 | 0 | 0 | 0 |
| y == CtbSizeY − 6 (or) CtbSizeY − 3 | 1 | 1 | 1 | 1 | 1 | 1 |
| y == CtbSizeY − 7 (or) CtbSizeY − 2 | 1 | 1 | 2 | 2 | 2 | 2 |
| yCtb + y == pic_height_in_luma_samples − 1 | 0 | 1 | 0 | 2 | 0 | 3 |
| yCtb + y == pic_height_in_luma_samples − 2 | 1 | 1 | 1 | 2 | 1 | 3 |
| yCtb + y == pic_height_in_luma_samples − 3 | 1 | 1 | 2 | 2 | 2 | 3 |
| yCtb + y == 0 | 1 | 0 | 2 | 0 | 3 | 0 |
| yCtb + y == 1 | 1 | 1 | 2 | 1 | 3 | 1 |
| yCtb + y == 2 | 1 | 1 | 2 | 2 | 3 | 2 |
| Other cases | 1 | 1 | 2 | 2 | 3 | 3 |

The variable sum is derived as follows:

$$sum = filterCoeff[0] * (recPictureL[hx, vy + r5] +$$ (8-1155)

$$recPictureL[hx, vy - r6]) + filterCoeff[1] * (recPictureL[hx + 1, vy + r3] +$$

$$recPictureL[hx - 1, vy - r4]) + filterCoeff[2] * (recPictureL[hx, vy + r3] +$$

$$recPictureL[hx, vy - r4]) + filterCoeff[3] * (recPictureL[hx - 1, vy + r3] +$$

$$recPictureL[hx + 1, vy - r4]) + filterCoeff[4] *$$

$$(recPictureL[hx + 2, vy + r1] + recPictureL[hx - 2, vy - r2]) +$$

$$filterCoeff[5] * (recPictureL[hx + 1, vy + r1] +$$

$$recPictureL[hx - 1, vy - r2]) + filterCoeff[6] * (recPictureL[hx, vy + r1] +$$

$$recPictureL[hx, vy - r2]) + filterCoeff[7] *$$

$$(recPictureL[hx - 1, vy + r1] + recPictureL[hz + 1, vy - r2]) +$$

$$filterCoeff[8] * (recPictureL[hx - 2, vy + r1] +$$

$$recPictureL[hx + 2, vy - r2]) + filterCoeff[9] * (recPictureL[hx + 3, vy] +$$

$$recPictureL[hx - 3, vy]) + filterCoeff[10] * (recPictureL[hx + 2, vy] +$$

$$recPictureL[hx - 2, vy]) + filterCoeff[11] * (recPictureL[hx + 1, vy] +$$

-continued $recPictureL[hx-1, vy]) + filterCoeff[12] * recPictureL[hx, vy]$ $sum = (sum + 64) \gg 7$ The modified filtered reconstructed luma picture sample alfPictureL[xCtb+x][yCtb+y] is derived as follows:

$alfPictureL[xCtb + x][yCtb + y] = \text{Clip3}(0, (1 \ll BitDepthY) - 1, sum)$.

2.3 Derivation Process for ALF Transpose and Filter Index for Luma Samples

Inputs of this Process are:
- a luma location (xCtb, yCtb) specifying the top-left sample of the current luma coding tree block relative to the top left sample of the current picture,
- a reconstructed luma picture sample array recPictureL prior to the adaptive loop filtering process.

Outputs of this Process are
- the classification filter index array filtIdx[x][y] with x, y=0 ... CtbSizeY−1,
- the transpose index array transposeIdx[x][y] with x, y=0 ... CtbSizeY−1.

The locations (hx, vy) for each of the corresponding luma samples (x, y) inside the given array recPicture of luma samples are derived as follows:

$hx = \text{Clip3}(0, pic\_width\_in\_luma\_samples - 1, x)$ if $yCtb + CtbSizeY \geq pic\_height\_in\_luma\_samples$ $vy = \text{Clip3}(0, pic\_height\_in\_luma\_samples - 1, y)$ Otherwise, if $y < (CtbSizeY - 4)$, $vy = \text{Clip3}(0, yCtb + CtbSizeY - 5, yCtb + y)$ Otherwise, $vy =$ $\text{Clip3}(yCtb + CtbSizeY - 4, pic\_height\_in\_luma\_samples - 1, yCtb + y)$ The classification filter index array filtIdx and the transpose index array transposeIdx are derived by the following ordered steps:

The variables filtH[x][y], filtV[x][y], filtD0[x][y] and filtD1[x][y] with x, y=−2 ... CtbSizeY+1 are derived as follows:

If both x and y are even numbers or both x and y are uneven numbers, the following applies:

$filtH[x][y] = \text{Abs}((recPicture[hxCtb + x, vyCtb + y] \ll 1) -$
$recPicture[hxCtb + x - 1, vyCtb + y] -$
$recPicture[hxCtb + x + 1, vyCtb + y])$ $filtV[x][y] = \text{Abs}((recPicture[hxCtb + x, vyCtb + y] \ll 1) -$
$recPicture[hxCtb + x, vyCtb + y - 1] -$
$recPicture[hxCtb + x, vyCtb + y + 1])$ $filtD0[x][y] = \text{Abs}((recPicture[hxCtb + x, vyCtb + y] \ll 1) -$
$recPicture[hxCtb + x - 1, vyCtb + y - 1] -$
$recPicture[hxCtb + x + 1, vyCtb + y + 1])$ $filtD1[x][y] = \text{Abs}((recPicture[hxCtb + x, vyCtb + y] \ll 1) -$
$recPicture[hxCtb + x + 1, vyCtb + y - 1] -$
$recPicture[hxCtb + x - 1, vyCtb + y + 1])$ Otherwise, filtH[x][y], filtV[x][y], filtD0[x][y] and filtD1[x][y] are set equal to 0. The variables varTempH1[x][y], varTempV1[x][y], varTempD01[x][y], varTempD11[x][y] and varTemp[x][y] with x, y=0 ... (CtbSizeY−1)>>2 are derived as follows:

If $(y \ll 2) == CtbSizeY - 8$ and $yCtb + CtbSizeY < pic\_height\_in\_luma\_samples - 1$ then $sumH[x][y] = \Sigma i \Sigma j \; filtH[(x \ll 2) + i][(y \ll 2) + j]$ with $i = -2 ... 5$ and
$j = -2 ... 3$ $sumV[x][y] = \Sigma i \Sigma j \; filtV[(x \ll 2) + i][(y \ll 2) + j]$ with $i = -2 ... 5$ and
$j = -2 ... 3$ $sumD0[x][y] = \Sigma i \Sigma j \; filtD0[(x \ll 2) + i][(y \ll 2) + j]$ with $i = -2 ... 5$ and
$j = -2 ... 3$ $sumD1[x][y] = \Sigma i \Sigma j \; filtD1[(x \ll 2) + i][(y \ll 2) + j]$ with $i = -2 ... 5$ and
$j = -2 ... 3$ variable Ac is set as 96 otherwise, If (y<<2)==CtbSizeY−4 and yCtb+CtbSizeY<pic_height_in_luma_samples−1 then $sumH[x][y] = \Sigma i \Sigma j \; filtH[(x \ll 2) + i][(y \ll 2) + j]$ with $i = -2 ... 5$ and
$j = 0 ... 5$ $sumV[x][y] = \Sigma i \Sigma j \; filtV[(x \ll 2) + i][(y \ll 2) + j]$ with $i = -2 ... 5$ and
$j = 0 ... 5$ $sumD0[x][y] = \Sigma i \Sigma j \; filtD0[(x \ll 2) + i][(y \ll 2) + j]$ with $i = -2 ... 5$ and
$j = 0 ... 5$ $sumD1[x][y] = \Sigma i \Sigma j \; filtD1[(x \ll 2) + i][(y \ll 2) + j]$ with $i = -2 ... 5$ and
$j = 0 ... 5$ variable Ac is set as 96
otherwise $sumH[x][y] = \Sigma i \Sigma j \; filtH[(x \ll 2) + i][(y \ll 2) + j]$ with $i$, (8-1168)
$j = -2 ... 5$ $sumV[x][y] = \Sigma i \Sigma j \; filtV[(x \ll 2) + i][(y \ll 2) + j]$ with $i$,
$j = -2 ... 5$ $sumD0[x][y] = \Sigma i \Sigma j \; filtD0[(x \ll 2) + i][(y \ll 2) + j]$ with $i$,
$j = -2 ... 5$ -continued $$sumD1[x][y] = \Sigma i \Sigma j\; filtD1[(x\ll 2)+i][(y\ll 2)+j] \text{ with } i,$$
$$j = -2 \ldots 5$$

$$sumOfHV[x][y] = sumH[x][y] + sumV[x][y]$$

variable Ac is set as 64

The variables dir1[x][y], dir2[x][y] and dirS[x][y] with x, y=0 . . . CtbSizeY−1 are derived as follows:

The variables hv1, hv0 and dirHV are derived as follows:
If sumV[x>>2][y>>2] is greater than sumH[x>>2][y>>2], the following applies:

$$hv1 = sumV[x\gg 2][y\gg 2]$$
$$hv0 = sumH[x\gg 2][y\gg 2]$$
$$dirHV = 1;$$

Otherwise, the following applies:

$$hv1 = sumH[x\gg 2][y\gg 2]$$
$$hv0 = sumV[x\gg 2][y\gg 2]$$
$$dirHV = 3.$$

The variables d1, d0 and dirD are derived as follows:
If sumD0[x>>2][y>>2] is greater than sumD1[x>>2][y>>2], the following applies:

$$d1 = sumD0[x\gg 2][y\gg 2]$$
$$d0 = sumD1[x\gg 2][y\gg 2]$$
$$dirD = 0;$$

Otherwise, the following applies:

$$d1 = sumD1[x\gg 2][y\gg 2]$$
$$d0 = sumD0[x\gg 2][y\gg 2]$$
$$dirD = 2.$$

The variables hvd1, hvd0, are derived as follows:

$$hvd1 = (d1 * hv0 > hv1 * d0)?\; d1:\; hv1$$
$$hvd0 = (d1 * hv0 > hv1 * d0)?\; d0:\; hv0.$$

The variables dirS[x][y], dir1[x][y] and dir2[x][y] derived as follows:

$$dir1[x][y] = (d1 * hv0 > hv1 * d0)?\; dirD:\; dirHV$$
$$dir2[x][y] = (d1 * hv0 > hv1 * d0)?\; dirHV:\; dirD$$
$$dirS[x][y] = (hvd1 > 2 * hvd0)?\; 1:\; ((hvd1 * 2 > 9 * hvd0)?\; 2:\; 0).$$

The variable avgVar[x][y] with x, y=0 . . . CtbSizeY−1 is derived as follows: varTab[ ]={0, 1, 2, 2, 2, 2, 2, 3, 3, 3, 3, 3, 3, 3, 3, 4}

$$avgVar[x][y] = varTab[Clip3(0, 15, (sumOfHV[x\gg 2][y\gg 2] * Ac)\gg$$

$$(3 + BitDepthY))].$$

The classification filter index array filtIdx[x][y] and the transpose index array transposeIdx[x][y] with x=y=0 . . . CtbSizeY−1 are derived as follows:

$$transposeTable[\,] = \{0, 1, 0, 2, 2, 3, 1, 3\}$$
$$transposeIdx[x][y] = transposeTable[dir1[x][y] * 2 + (dir2[x][y]\gg 1)]$$
$$filtIdx[x][y] = avgVar[x][y]$$

When dirS[x][y] is not equal 0, filtIdx[x][y] is modified as follows:

$$filtIdx[x][y] \mathrel{+}= (((dir1[x][y]\; \&\; 0x1)\ll 1) + dirS[x][y]) * 5.$$

2.4 Coding Tree Block Filtering Process for Chroma Samples

Inputs of this Process are:
- a reconstructed chroma picture sample array recPicture prior to the adaptive loop filtering process,
- a filtered reconstructed chroma picture sample array alfPicture,
- a chroma location (xCtbC, yCtbC) specifying the top-left sample of the current chroma coding tree block relative to the top left sample of the current picture.

Output of this process is the modified filtered reconstructed chroma picture sample array alfPicture.

The size of the current chroma coding tree block ctbSizeC is derived as follows:

$$ctbSizeC = CtbSizeY/SubWidthC.$$

For the derivation of the filtered reconstructed chroma samples alfPicture[x][y], each reconstructed chroma sample inside the current chroma coding tree block recPicture[x][y] is filtered as follows with x, y=0 . . . ctbSizeC−1:

The locations (hx, vy) for each of the corresponding chroma samples (x, y) inside the given array recPicture of chroma samples are derived as follows:

$$hx = Clip3(0,\; pic\_width\_in\_luma\_samples/SubWidthC - 1,\; xCtbC + x)$$
$$vy = y$$

filter input sample Position offset r=0 . . . 4 are derived according to chroma sample position y as shown in the Table 2.4 below TABLE 2.4b Specification of filer input sample position offset
r = 0 . . . 4 according to the chroma sample position y

| y | r1 | r2 | r3 | r4 |
|---|---|---|---|---|
| y == CtbSizeC − 2 (or) CtbSizeC − 3 | 0 | 0 | 0 | 0 |
| y == CtbSizeC − 1 (or) CtbSizeC − 4 | 1 | 1 | 1 | 1 |
| y == CtbSizeY − 7 (or) CtbSizeY − 2 | 1 | 1 | 2 | 2 |
| yCtb + y == (pic_height_in_luma_samples/SubHeightC − 1) − 1 | 0 | 1 | 0 | 2 |
| yCtb + y == (pic_height_in_luma_samples/SubHeightC − 1) − 2 | 1 | 1 | 1 | 2 |
| yCtb + y == 0 | 1 | 0 | 2 | 0 |
| yCtb + y == 1 | 1 | 1 | 2 | 1 |
| Other cases | 1 | 1 | 2 | 2 |

The Variable Sum is Derived as Follows:

$$sum = AlfCoeffC[0] * (recPicture[hx, vy + r3] + recPicture[hx, vy - r4]) +$$
$$AlfCoeff[1] * (recPicture[hx + 1, vy + r1] + recPicture[hx - 1, vy - r2]) +$$
$$AlfCoeffC[2] * (recPicture[hx, vy + r1] + recPicture[hx, vy - r2]) +$$
$$AlfCoeffC[3] * (recPicture[hx - 1, vy + r1] + recPicture[hx + 1, vy - r2]) +$$
$$AlfCoeffC[4] * (recPicture[hx + 2, vy] + recPicture[hx - 2, vy]) +$$
$$AlfCoeffC[5] * (recPicture[hx + 1, vy] + recPicture[hx - 1, vy]) +$$
$$AlfCoeffC[6] * recPicture[hx, vy]$$
$$sum = (sum + 64) \gg 7$$

The modified filtered reconstructed chroma picture sample alfPicture[xCtbC+x][yCtbC+y] is derived as follows:

$$alfPicture[xCtbC + x][yCtbC + y] = Clip3(0, (1 \ll BitDepthC) - 1, sum).$$

For Solution 2:

$$c12' = c12 + 2*c0 + 2*c1 + 2*c2 + 2*c3 + 2*c4 + 2*c5 + 2*c6 + 2*c7 + 2*c8$$

An additional solution (solution 3) which is depicted in FIG. 12C can also be used to perform filtering of the lines H, J, I (above virtual boundary) and lines K, L, M (below virtual boundary). Based on the dominant edge direction for a given block, the ALF filter is modified.

It has to be noted that any algorithm which can derive the dominant edge direction for the given block can be used and is not limited to the algorithm explained below. The dominant edge direction for the given block can be computed using the gradient values computed for the given block i.e. using the gradient values $g_v$, $g_h$ $g_{d1}$ and $g_{d2}$ and directionality value D computed during the ALF block classification. If the directionality value D is 0, 1, 2 then as depicted in FIG. 12C, sub-figure c, the solution 1 (adding coefficients vertically) is chosen. If the directionality value D is 3 or 4 (case when the directionality of the block has a strong "diagonal" edge), then the following further condition $g_{d1}$ is greater than or equal to $g_{d2}$ is checked. If true, then the 135 degree gradient is chosen as the dominant edge direction and therefore as depicted in FIG. 12C, sub-figure b, the modified filtering is performed as follows:

For lines M and H c3'=c3+c0
For lines L and I $$c6' = c6 + c1$$
$$c7' = c7 + c2$$
$$c8' = c3 + c8 + c0$$

For lines J and K:

$$c9' = c9 + c8 + c3 + c0$$
$$c10' = c10 + c7 + c2$$
$$c11' = c1 + c6 + c11 + c4$$
$$c12' = c12 + 2*c5$$

On the other hand if $g_{d2}$ is greater than $g_{d1}$ then as depicted in FIG. 12C, sub-figure a, the modified filtering is performed as follows:

For lines M and H c1'=c1+c0
For lines L and I $$c4' = c1 + c4 + c0$$
$$c5' = c5 + c2$$
$$c6' = c6 + c3$$

For lines J and K:

$$c9' = c9 + c4 + c1 + c0$$
$$c10' = c10 + c5 + c2$$
$$c11' = c8 + c7 + c6 + c3 + c11$$
$$c12' = c12 + 2*c7$$

It has to be noted that if a given filter is transformed as given in table 1, then all the above solutions can still be used. The equations in the above solutions are given for the case when no transformation is applied. For a transformed filter, the coefficients in the equations can be replaced based on the equations 17, 18, 19 respectively.

An additional solution (solution 4) which is depicted in FIGS. 19A and 19B, disables filtering when the absolute sum of the padded coefficients is greater than a threshold (T) times the absolute sum of the non padded coefficients. For example, for lines M and H, if (2*abs (c0)>(T*(2*(abs (c1)+abs (c2)+abs(c3)+abs(c4)+abs(c5)+abs(c6)+abs(c7)+abs(c8)+abs(c9)+abs(c10)+abs(c11))+abs(c12))) then the ALF filtering is disabled for lines M and H.

Similarly for lines L and I, if (2*(abs (c0)+abs (c1)+abs (c2)+abs (c3))>(T*(2*(abs(c4)+abs(c5)+abs(c6)+abs(c7)+abs(c8)+abs(c9)+abs(c10)+abs(c11))+abs(c12))), then the ALF filtering is disabled for lines L and I.

Similarly for lines J and K, if (2*(abs (c0)+abs (c1)+abs (c2)+abs (c3)+abs(c4)+abs(c5)+abs(c6)+abs(c7)+abs(c8))>(T*(2*(abs(c9)+abs(c10)+abs(c11))+abs(c12))), then the ALF filtering is disabled for lines J and K.

Where T is generally a threshold which can take a fractional values ranging between 0 and 1. For example, T value can be 0.5, 0.6 or 0.7

Similarly for Chroma, as depicted in FIG. 20, for lines N and K, if (2*abs (c0)>(T*(2*(abs (c1)+abs (c2)+abs(c3)+abs(c4)+abs(c5))+abs(c6)))), then the ALF filtering is disabled for lines N and K.

for lines M and L, if ((2*(abs (c0)+abs (c1)+abs (c2)+abs (c3))>(T*(2*(abs(c4)+abs(c5))+abs(c6)))), then the ALF filtering is disabled for lines M and L. the function abs(x) is defined as follows:

$$\mathrm{Abs}(x) = \begin{cases} x; & x >= 0 \\ -x; & x < 0 \end{cases}$$

According to an alternative solution, the filtering operation is disabled if based on the determined geometric transformation and the horizontal proximity of the filtered pixel sample to the virtual boundary. In other words assume that the pixel sample to be filtered is N samples above or below the virtual boundary (horizontal distance is N to horizontal boundary) and the determined geometric filter transformation is transformation_X. The filtering operation is disabled for a pixel sample if:

If N is smaller than a predetermined threshold, namely thr,

And if transformation_X is among a set of transformations that are predetermined or indicated in the bitstream.

According to one specific example thr is equal to 1 (indicating the row of samples that are one line above and one line below the virtual boundary). According to another example the set of transformations include at least one of 'No transformation', 'Diagonal', 'Vertical flip', 'Rotation'. According to another example thr is equal to 1 and the set of transformations include at least one of 'No transformation', 'Diagonal', 'Vertical flip', 'Rotation'. In another example the set of transformations include Diagonal and Rotation.

It is noted that the set of transformations is a subset of all possible filter transformations. According to document JVET1001_v7 "Versatile Video Coding (Draft 3)" document (publicly accessible at http://phenix.it-sudparis.eu/jvet/), there are 4 possible filter transformations. In the document the filter transformation is determined according to subsection "8.5.4.3 Derivation process for ALF transpose and filter index for luma samples', and the determined transformation is indicated by variable transposeIdx. The values that can be assumed by transposeIdx are 0, 1, 2 and 3.

According to one example the filtering operation is disabled for a pixel sample if the transposeIdx is determined to be equal to a predetermined value. It is noted that the set of predetermined values includes at least one value between 0 and 3. It is further noted that the set of predetermined values does not include all of the possible values (all of 0, 1, 2 and 3).

In another example the filtering operation is disabled if the pixel to be filtered is one sample above or below the virtual boundary and the determined filter transformation is among a set of predetermined values.

Line Buffer Requirements for Chroma Samples:

FIG. 13 depicts the line buffer requirements for the chroma samples. As deblocking only uses 2 samples and modifies a maximum of 1 sample, the chroma ALF line buffer requirements come down to 6.25 lines. Since no explicit block classification is performed for the chroma samples, only the filtering has to be modified at the virtual boundaries (VBs). FIG. 14 shows the distorted version of the filter generated by either using padding (solution 1) or by adding the discarded coefficient to the center coefficient (solution 2)

Modified Block Classification when Virtual Boundary is 6 Lines

FIG. 15 shows the ALF line buffer requirements when the deblocking filter uses 6 lines of line buffer. Therefore, the virtual boundary is 6 lines above the CTU boundary. For this case, the total loop filter line buffer requirement increases to 15.25 lines.

To reduce the line buffer requirements, FIG. 16 depicts one solution which is explained below: The block classification of the 4×4 block starting at line C is achieved by padding the line H to line I to ensure the block classification does not require any line below the virtual boundary.

Lines G, H re-use block classification decision from block C, D, E, F. Lines I, J re-use block classification decision from lines K, L, M, N (or) lines I, J, K, L can be considered as one 4×4 block segment and classification is performed for these 4 lines, and then lines M, N re-use the block classification decision from block K, L, M, N.

FIG. 17 uses a grid-shifting approach where the first two lines at the top picture boundary and last two lines at the bottom picture boundary are classified and filtered separately and therefore the ALF classification and filtering grid is moved by 2 samples down in the Y axis. This solution has an advantage that a given 4×4 block never overlaps or crosses across a virtual boundary. In general, when the virtual boundary size is not a multiple of 4 (ALF block classification size), then the ALF filtering grid can be shifted by using the following formula:

((Virtual boundary size)/4)–4. For the actual filtering itself, the distorted version of the filter explained in FIGS. 12A, 12B and 12C can be used.

Further embodiments of the present invention are provided in the following. It should be noted that the numbering used in the following section does not necessarily need to comply with the numbering used in the previous sections.

Embodiment 1. A method of filtering a sample value of a picture, the picture comprising a first block and a second block, the first block and the second block adjoining each other in a block boundary, wherein the picture comprises at least n×m samples p(i,j) arranged in n rows and m columns, wherein i is a row index that runs from 1 to n and j is a column index that runs from 1 to m, wherein samples p(i,j) with i from 1 to k belong to the first block and samples with i from k+1 to n belong to the second block, wherein k is an integer number less than n, wherein the method comprises, with an integer t that is less than k and with an integer j in the range of 1 to m:

generating, with an integer i in the range of 1 to k-t-1, a filtered sample value by applying a filter to the value of the sample p(i,j), wherein the filter is supported by a set of filter support samples, wherein the set of filter support samples comprises the sample p(i,j) and one or more further samples, wherein the set of filter support samples does not comprise any samples p(i',j') with row index i' greater than k-t-1, and/or generating, with an integer i in the range of k-t to k, a filtered sample value by applying a filter to the value of the sample p(i,j), wherein the filter is supported by a set of filter support samples, wherein the set of filter support samples comprises the sample p(i,j) and one or more further samples, wherein the set of filter support samples does not comprise any samples p(i',j') with row index i' less than k-t.

Embodiment 2. A method of filtering sample values of a picture, the picture comprising a first block and a second block, the first block and the second block adjoining each other in a block boundary,
- wherein the picture comprises at least n×m samples p(i,j) arranged in n rows and m columns,
- wherein i is a row index that runs from 1 to n and j is a column index that runs from 1 to m,
- wherein samples p(i,j) with i from 1 to k belong to the first block and samples with i from k+1 to n belong to the second block, wherein k is an integer number less than n,
- wherein the method comprises, with an integer t that is less than k and for each i from 1 to k, and each j from 1 to m:
  - generating a filtered sample value by applying a filter to the value of sample p(i,j), wherein the filter is supported by a set of filter support samples, wherein the set of filter support samples comprises the sample p(i,j) and one or more further samples, wherein if i is in the range of 1 to k-t-1, the set of filter support samples does not comprise any samples p(i',j') with row index i' greater than k-t-1, and wherein if i is in the range of k-t to k, the set of filter support samples does not comprise any samples p(i',j') with row index i' less than k-t.

Embodiment 3. The method of embodiment 1 or 2, wherein the first block is a first coding tree unit, CTU, and the second block is a second CTU.

Embodiment 4. The method of any one of embodiments 1 to 3, wherein t is 2, 3, 4, 5 or 6.

Embodiment 5. The method of any one of embodiments 1 to 4,
- wherein for each i in the range of 1 to k-t-1 and for each j from 1 to m, the set of filter support samples comprises multiple samples p(i',j') with i' in the range of 1 to k-t-1; and
- wherein for each i in the range of k-t to k and for each j from 1 to m, the set of filter support samples comprises multiple samples p(i',j') with i' equal to or greater than k-t.

Embodiment 6. The method of embodiment 5, wherein for each i in the range of k-t to k and for each j from 1 to m, the set of filter support samples further comprises one or more samples p(i',j') with i' greater than k.

Embodiment 7. The method of any one of embodiments 1 to 6, wherein the filter is an in-loop filter.

Embodiment 8. The method of any one of embodiments 1 to 7, wherein the filter comprises a deblocking filter.

Embodiment 9. The method of any one of embodiments 1 to 8, wherein the filter comprises a deblocking filter, a sample adaptive offset filter, SAO, and an adaptive loop filter, ALF,
- wherein the SAO is applied after the deblocking filter, and the ALF is applied after the SAO.

Embodiment 10. The method of any one of embodiments 1 to 9, comprising:
- determining sample values of the first block;
- applying the filter to the sample values of the first block in rows 1 to k-t-1; storing the sample values of the first block from rows k-t to k in a buffer;
- determining sample values of the second block; and
- applying the filter to the sample values of the first block in rows k-t that have been stored the buffer.

Embodiment 11. The method of any one of embodiments 1 to 10, wherein the filter is an adaptive loop filter, and the adaptive filter is determined by using a classification step which accesses samples of the current block and also samples surrounding the block.

Embodiment 12. The method of embodiment 11, wherein when samples surrounding the block are not available, the adaptive filter is determined by using a normalization value, wherein the normalization value is a positive integer value and is dependent on the number of accessible samples surrounding a given block.

Embodiment 13. The method of embodiment 11 or 12, wherein the normalization value has an inverse relationship with the number of accessible samples.

Embodiment 14. The method of any of the embodiments 10 to 13, where in the normalization value is 96, when not all the samples surrounding the block are available.

Embodiment 15. The method of any of the embodiments 10 to 14, wherein the normalization value is 64, when all the samples surrounding the block are available.

Embodiment 16. The method of any one of embodiments 1 to 10, wherein the filter is an adaptive loop filter.

Embodiment 17. The method of any one of the embodiments 1 to 10, wherein a symmetric padding operation is applied when required samples are not accessible for filtering a given sample.

Embodiment 18. The method of the embodiment 17, wherein the symmetric padding operation is defined as replacing the unavailable samples by immediate neighboring samples which are available for filtering operation.

Embodiment 19. The method of any of embodiment 17 or 18, wherein the symmetric padding operation is defined as a method that the filter is made symmetric by applying the padding operation on both sides of the filter even though on one side, the filter samples can still be accessible.

Embodiment 20. The method of any one of embodiments 1 to 19, wherein the picture is included in a frame of a video sequence.

Embodiment 21. The method of any one of embodiments 1 to 20, performed to encode or decode the picture, or performed to encode or decode a video sequence that comprises the picture.

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e., the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g., residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g., of the encoder 20 and the decoder 30, and functions described herein, e.g., with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

The encoder 20 and/or decoder 30 may comprise processing circuitry 46 configured to perform the various operations and methods described herein. The processing circuitry 46 may comprise hardware and software. The hardware may comprise analog circuitry or digital circuitry, or both analog and digital circuitry. Digital circuitry may comprise components such as application-specific integrated circuits (ASICs), field-programmable arrays (FPGAs), digital signal processors (DSPs), or general-purpose processors. In particular, the filters mentioned herein may be implemented in hardware or in software or in a combination of hardware and software. In one embodiment, the processing circuitry comprises one or more processors and a non-transitory memory connected to the one or more processors. The non-transitory memory may carry executable program code which, when executed by the one or more processors, causes the encoder 20 and/or decoder 30 to perform the operations or methods described herein.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

For reference, the following logical operators are defined as follows:

x && y Boolean logical "and" of x and y x|| yfBoolean logical "or" of x and y

! Boolean logical "not"

x? y:z If x is TRUE or not equal to 0, evaluates to the value of y; otherwise, evaluates to the value of z.

For reference, the following relational operators are defined as follows:

>Greater than

>=Greater than or equal to

<Less than

<=Less than or equal to

==Equal to

!=Not equal to

When a relational operator is applied to a syntax element or variable that has been assigned the value "na" (not applicable), the value "na" is treated as a distinct value for the syntax element or variable. The value "na" is considered not to be equal to any other value.

For reference, the following bit-wise operators are defined as follows:

& Bit-wise "and". When operating on integer arguments, operates on a two's complement representation of the integer value. When operating on a binary argument that contains fewer bits than another argument, the shorter argument is extended by adding more significant bits equal to 0.

|Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

In summary, the present disclosure provides a method of filtering a sample value of a picture, the picture comprising a first block and a second block, the first block and the second block adjoining each other in a block boundary, wherein the picture comprises at least n×m (n times m) samples p(i,j) arranged in n rows and m columns, wherein i is a row index that runs from 1 to n and j is a column index that runs from 1 to m, wherein samples p(i,j) with i from 1 to k belong to the first block and samples with i from k+1 to n belong to the second block, wherein k is an integer number less than n, wherein the method comprises, with an integer q that is less than k and with an integer j in the range of 1 to m: generating, with an integer i in the range of 1 to k-q-1, a filtered sample value by applying a filter to the value of the sample p(i,j), wherein the filter is supported by a set of filter support samples, wherein the set of filter support samples comprises the sample p(i,j) and one or more further samples, wherein the set of filter support samples does not comprise any samples p(i',j') with row index i' greater than k-q-1, and/or generating, with an integer i in the range of k-q to k, a filtered sample value by applying a filter to the value of the sample p(i,j), wherein the filter is supported by a set of filter support samples, wherein the set of filter support samples comprises the sample p(i,j) and one or more further samples, wherein the set of filter support samples does not comprise any samples p(i',j') with row index i' less than k-q.

The invention claimed is:

1. An device for filtering a sample value of a picture having a first block and a second block, the first block and the second block adjoining each other in a block boundary, wherein the picture comprises at least n×m samples p(i,j) arranged in n rows and m columns, wherein i is a row index that runs from 1 to n and j is a column index that runs from 1 to m, wherein samples p(i,j) with i from 1 to k belong to the first block and samples with i from k+1 to n belong to the second block, and wherein k is an integer number less than n, the device comprising:
a memory containing instructions; and
one or more processors in communication with the memory, wherein the one or more processors, upon execution of the instructions, are configured to perform operations of:
when an integer t that is less than k and each j is in a range of 1 to m:
generating, with each i in a range of 1 to k-t-1, a first filtered sample value by applying a first filter to each value of the sample p(i,j), wherein the first filter is supported by a first set of filter support samples, wherein the first set of filter support samples comprises the sample p(i,j) and one or more further samples, and wherein the first set of filter support samples does not comprise any samples p (i',j') with row index i' greater than k-t-1, wherein the first filter performs a first weighted sum calculation on 13 weighted components to obtain a first variable sum and the first filtered sample value based on the first variable sum;
generating, with the row index i in the range of k-t to k, a second filtered sample value by applying a second filter to each value of the sample p(i,j), wherein the second filter is supported by a second set of filter support samples, wherein the second set of filter support samples comprises the sample p(i,j) and one or more further samples, and wherein the second set of filter support samples does not comprise any samples p (i',j') with row index i' less than k-t,
wherein the second filter performs a second weighted sum calculation on 13 weighted components to obtain a second variable sum and the second filtered sample value based on the second variable sum, and wherein the row index i and the column index j are integers.

2. The device of claim 1, wherein the first block is a first coding tree unit (CTU), and the second block is a second CTU, and the block boundary is a CTU boundary.

3. The device of claim 1, wherein the integer t is 2, 3, 4, 5 or 6.

4. The device of claim 2, wherein for the samples p(i,j) being luma samples, a virtual boundary is 4 lines above the CTU boundary, or the virtual boundary is 4 lines above a bottom boundary of the first CTU.

5. The device of claim 4, wherein the integer t is 4 in response to the virtual boundary being 4 lines above the CTU boundary.

6. The device of claim 2, wherein for the samples p(i,j) being chroma samples, a virtual boundary is 2 lines above the CTU boundary, or the virtual boundary is 2 lines above a bottom boundary of the first CTU.

7. The device of claim 6, wherein the integer t is 2 in response to the virtual boundary being 2 lines above the CTU boundary.

8. The device of claim 2, wherein the row index i being k corresponds to the CTU boundary, and/or the row index i being (k-t) corresponds to the virtual boundary.

9. The device of claim 1, wherein for each i in the range of 1 to k-t-1 and for each j from 1 to m, the first set of filter support samples comprises multiple samples p (i',j') with i' in the range of 1 to k-t-1, and
wherein for each i in the range of k-t to k and for each j from 1 to m, the second set of filter support samples comprises multiple samples p (i',j') with i' equal to or greater than k-t.

10. The device of claim 9, wherein for each i in the range of k-t to k and for each j from 1 to m, the second set of filter support samples further comprises one or more samples p (i',j') with i' greater than k.

11. The device of claim 1, wherein
in case that i'>k-t-1, a first sample vertically positioned above a virtual boundary is used as a first padded value that replaces a second sample vertically positioned below the virtual boundary, and the first set of filter support samples comprises the first sample and the second sample; and/or
in case that i'<k-t, a third sample vertically positioned below the virtual boundary is used as a second padded value that replaces a fourth sample vertically positioned above the virtual boundary, and the second set of filter support samples comprises the third sample and the fourth sample,
wherein number of times of the first or third sample is respectively used as the first padded value or second padded value is determined based on a distance of currently filtered sample p(i,j) to the virtual boundary.

12. The device of claim 4, wherein a set of vertical sample position offsets associated with each set of filter support samples is determined according to a luma vertical sample position of the sample p(i,j) in response to the virtual boundary being 4 lines above the CTU boundary.

13. The device of claim 6, wherein a set of vertical sample position offsets associated with each set of filter support samples is determined according to a chroma vertical sample position of the sample p(i,j) in response to the virtual boundary being 2 lines above the CTU boundary.

14. The device of claim 1, wherein each of the first filter and the second filter is an adaptive loop filter, and the adaptive loop filter is determined by using a classification step that accesses samples of a given block and also samples surrounding the given block.

15. The device of claim 14, wherein a normalization value (Ac) has an inverse relationship with number of accessible samples.

16. The device of claim 15, wherein the normalization value is 96, when not all samples surrounding the given block are available.

17. The device of claim 15, wherein the normalization value is 64, when all samples surrounding the given block are available.

18. A method of filtering a sample value of a picture having a first block and a second block, the first block and the second block adjoining each other in a block boundary, wherein the picture comprises at least n×m samples p(i,j) arranged in n rows and m columns, wherein i is a row index that runs from 1 to n and j is a column index that runs from 1 to m, wherein samples p(i,j) with i from 1 to k belong to the first block and samples with i from k+1 to n belong to the second block, and wherein k is an integer number less than n, the method comprising:
  when an integer t that is less than k and each j is in the range of 1 to m:
  generating, with each i in the range of 1 to k-t-1, a first filtered sample value by applying a first filter to each value of the sample p(i,j), wherein the first filter is supported by a first set of filter support samples, wherein the first set of filter support samples comprises the sample p(i,j) and one or more further samples, and wherein the first set of filter support samples does not comprise any samples p (i',j') with row index i' greater than k-t-1, wherein the first filter performs a first weighted sum calculation on 13 weighted components to obtain a first variable sum and the first filtered sample value based on the first variable sum;
  generating, with each i in the range of k-t to k, a second filtered sample value by applying a second filter to each value of the sample p(i,j), wherein the second filter is supported by a second set of filter support samples, wherein the second set of filter support samples comprises the sample p(i,j) and one or more further samples, and wherein the second set of filter support samples does not comprise any samples p (i',j') with row index i' less than k-t,
  wherein the second filter performs a second weighted sum calculation on 13 weighted components to obtain a second variable sum and the second filtered sample value based on the second variable sum, and wherein the row index i and the column index j are integers.

19. A non-transitory storage medium storing an encoded bitstream for video signals, the encoded bitstream comprises a plurality of syntax elements, wherein the plurality of syntax elements comprises an indicator, and the indicator is signaled to indicate whether a filter is applied to a coding tree block, wherein the filter is for filtering a sample value of a picture having a first block and a second block, the first block and the second block adjoining each other in a block boundary, wherein the picture comprises at least n×m samples p(i,j) arranged in n rows and m columns, wherein i is a row index that runs from 1 to n and j is a column index that runs from 1 to m, wherein samples p(i,j) with i from 1 to k belong to the first block and samples with i from k+1 to n belong to the second block, and wherein k is an integer number less than n,
  wherein a method implemented by the filter comprises, with an integer t that is less than k and with each j in the range of 1 to m:
  generating, with each i in the range of 1 to k-t-1, a first filtered sample value by applying a first filter to each value of the sample p(i,j), wherein the first filter is supported by a first set of filter support samples, wherein the first set of filter support samples comprises the sample p(i,j) and one or more further samples, and wherein the first set of filter support samples does not comprise any samples p (i',j') with row index i' greater than k-t-1, wherein the first filter performs a first weighted sum calculation on 13 weighted components to obtain a first variable sum and the first filtered sample value based on the first variable sum;
  generating, with each i in the range of k-t to k, a second filtered sample value by applying a second filter to each value of the sample p(i,j), wherein the second filter is supported by a second set of filter support samples, wherein the second set of filter support samples comprises the sample p(i,j) and one or more further samples, and wherein the second set of filter support samples does not comprise any samples p (i',j') with row index i' less than k-t,
  wherein the second filter performs a second weighted sum calculation on 13 weighted components to obtain a second variable sum and the second filtered sample value based on the second variable sum, and wherein the row index i and the column index j are integers.

* * * * *